United States Patent
Tsai et al.

(10) Patent No.: US 12,446,098 B2
(45) Date of Patent: Oct. 14, 2025

(54) METHOD AND USER EQUIPMENT FOR LOGICAL CHANNEL CONFIGURATION IN SMALL DATA TRANSMISSION

(71) Applicant: SHARP KABUSHIKI KAISHA, Sakai (JP)

(72) Inventors: Hsin-Hsi Tsai, Taipei (TW); Heng-Li Chin, Taipei (TW); Mei-Ju Shih, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 473 days.

(21) Appl. No.: 17/966,147

(22) Filed: Oct. 14, 2022

(65) Prior Publication Data

US 2023/0122493 A1    Apr. 20, 2023

Related U.S. Application Data

(60) Provisional application No. 63/255,873, filed on Oct. 14, 2021.

(51) Int. Cl.
*H04W 76/27* (2018.01)
*H04W 72/0453* (2023.01)
*H04W 72/23* (2023.01)

(52) U.S. Cl.
CPC ....... *H04W 76/27* (2018.02); *H04W 72/0453* (2013.01); *H04W 72/23* (2023.01)

(58) Field of Classification Search
CPC . H04W 76/27; H04W 76/30; H04W 72/0453; H04W 72/23
See application file for complete search history.

(56) References Cited

U.S. PATENT DOCUMENTS

| | | | |
|---|---|---|---|
| 12,082,151 B2* | 9/2024 | Lee | H04W 68/02 |
| 2022/0330374 A1* | 10/2022 | Kim | H04W 76/27 |
| 2022/0417901 A1* | 12/2022 | Lee | H04W 76/27 |
| 2024/0251435 A1* | 7/2024 | Turtinen | H04W 72/56 |

OTHER PUBLICATIONS

3GPP TS 38.300 V16.6.0 (Jun. 2021), 3rd Generation Partnership Project; Technical Specification Group Radio Access Network; NR; NR and NG-RAN Overall Description; Stage 2 (Release 16).
(Continued)

*Primary Examiner* — Farid Seyedvosoghi
(74) *Attorney, Agent, or Firm* — ScienBiziP, P.C.

(57) ABSTRACT

A method and a user equipment (UE) for logical channel (LCH) configuration in small data transmission (SDT) are provided. The method includes: receiving, from a base station (BS), a radio resource control (RRC) release message; determining whether the RRC release message includes a specific configuration, the specific configuration including an SDT configuration and an SDT-specific LCH configuration; transitioning to an RRC_INACTIVE state after determining that the RRC release message includes the specific configuration; initiating an SDT procedure based on the SDT configuration when the UE is in the RRC_INACTIVE state; and applying at least one LCH restriction parameter included in the SDT-specific LCH configuration for a Logical Channel Prioritization (LCP) procedure during the SDT procedure.

16 Claims, 6 Drawing Sheets

(56) References Cited

OTHER PUBLICATIONS

3GPP TS 38.331 V16.5.0 (Jun. 2021), 3rd Generation Partnership Project; Technical Specification Group Radio Access Network; NR; Radio Resource Control (RRC) protocol specification (Release 16).
3GPP TS 38.321 V16.5.0 (Jun. 2021), 3rd Generation Partnership Project; Technical Specification Group Radio Access Network; NR; Medium Access Control (MAC) protocol specification (Release 16).
3GPP TS 38.212 V16.6.0 (Jun. 2021), 3rd Generation Partnership Project; Technical Specification Group Radio Access Network; NR; Multiplexing and channel coding (Release 16).
3GPP TS 38.213 V16.6.0 (Jun. 2021), 3rd Generation Partnership Project; Technical Specification Group Radio Access Network; NR; Physical layer procedures for control (Release 16).
3GPP TS 38.214 V16.6.0 (Jun. 2021), 3rd Generation Partnership Project; Technical Specification Group Radio Access Network; NR; Physical layer procedures for data (Release 16).
3GPP TS 38.306 V16.5.0 (Jun. 2021), 3rd Generation Partnership Project; Technical Specification Group Radio Access Network; NR; User Equipment (UE) radio access capabilities (Release 16).
3GPP TS 38.322 V16.2.0 (Dec. 2020), 3rd Generation Partnership Project; Technical Specification Group Radio Access Network; NR; Radio Link Control (RLC) protocol specification (Release 16).
3GPP TS 38.323 V16.4.0 (Jun. 2021), 3rd Generation Partnership Project; Technical Specification Group Radio Access Network; NR; Packet Data Convergence Protocol (PDCP) specification (Release 16).

\* cited by examiner

METHOD AND USER EQUIPMENT FOR LOGICAL CHANNEL CONFIGURATION IN SMALL DATA TRANSMISSION

CROSS-REFERENCE TO RELATED APPLICATION(S)

The present disclosure claims the benefit of and priority to U.S. Provisional Patent Application Ser. No. 63/255,873, filed on Oct. 14, 2021, entitled "LOGICAL CHANNEL CONFIGURATION AND RESTRICTION FOR SMALL DATA TRANSMISSION", the contents of which is hereby incorporated fully by reference into the present disclosure for all purposes.

FIELD

The present disclosure is related to wireless communication and, more particularly, to a method and a user equipment (UE) for logical channel (LCH) configuration in small data transmission (SDT) in the next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the art.

SUMMARY

The present disclosure is related to a method and a user equipment for logical channel (LCH) configuration in small data transmission (SDT) in next generation wireless communication networks.

In a first aspect of the present disclosure, a method performed by a user equipment (UE) for logical channel (LCH) configuration in small data transmission (SDT) is provided. The method includes: receiving, from a base station (BS), a radio resource control (RRC) release message; determining whether the RRC release message includes a specific configuration, the specific configuration including an SDT configuration and an SDT-specific LCH configuration; transitioning to an RRC_INACTIVE state after determining that the RRC release message includes the specific configuration; initiating an SDT procedure based on the SDT configuration when the UE is in the RRC_INACTIVE state; and applying at least one LCH restriction parameter included in the SDT-specific LCH configuration for a Logical Channel Prioritization (LCP) procedure during the SDT procedure.

In an implementation of the first aspect of the present disclosure, the at least one LCH restriction parameter includes an information element (IE) configuredGrantType1Allowed.

In another implementation of the first aspect of the present disclosure, the at least one LCH restriction parameter includes an information element (IE) allowedCG-List.

In another implementation of the first aspect of the present disclosure, the SDT-specific LCH configuration is included in a configured grant (CG)-SDT-specific configuration, and the CG-SDT-specific configuration is included in the SDT configuration.

In another implementation of the first aspect of the present disclosure, the SDT-specific LCH configuration is used for a configured grant (CG)-SDT.

In another implementation of the first aspect of the present disclosure, the SDT procedure is a configured grant (CG)-SDT procedure.

In another implementation of the first aspect of the present disclosure, the method further includes applying the LCP procedure when a new transmission is performed during the SDT procedure.

In another implementation of the first aspect of the present disclosure, the method further includes selecting an LCH for an uplink (UL) grant based on the at least one LCH restriction parameter when a new transmission is performed during the LCP procedure.

In another implementation of the first aspect of the present disclosure, the method further includes transitioning to an RRC_IDLE state after determining that the RRC release message does not include the specific configuration.

In a second aspect of the present disclosure, a UE for logical channel (LCH) configuration in small data transmission (SDT) is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive, from a base station (BS), a radio resource control (RRC) release message; determine whether the RRC release message includes a specific configuration, the specific configuration including an SDT configuration and an SDT-specific LCH configuration; transition to an RRC_INACTIVE state after determining that the RRC release message includes the specific configuration; initiate an SDT procedure based on the SDT configuration when the UE is in the RRC_INACTIVE state; and apply at least one LCH restriction parameter included in the SDT-specific LCH configuration for a Logical Channel Prioritization (LCP) procedure during the SDT procedure.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
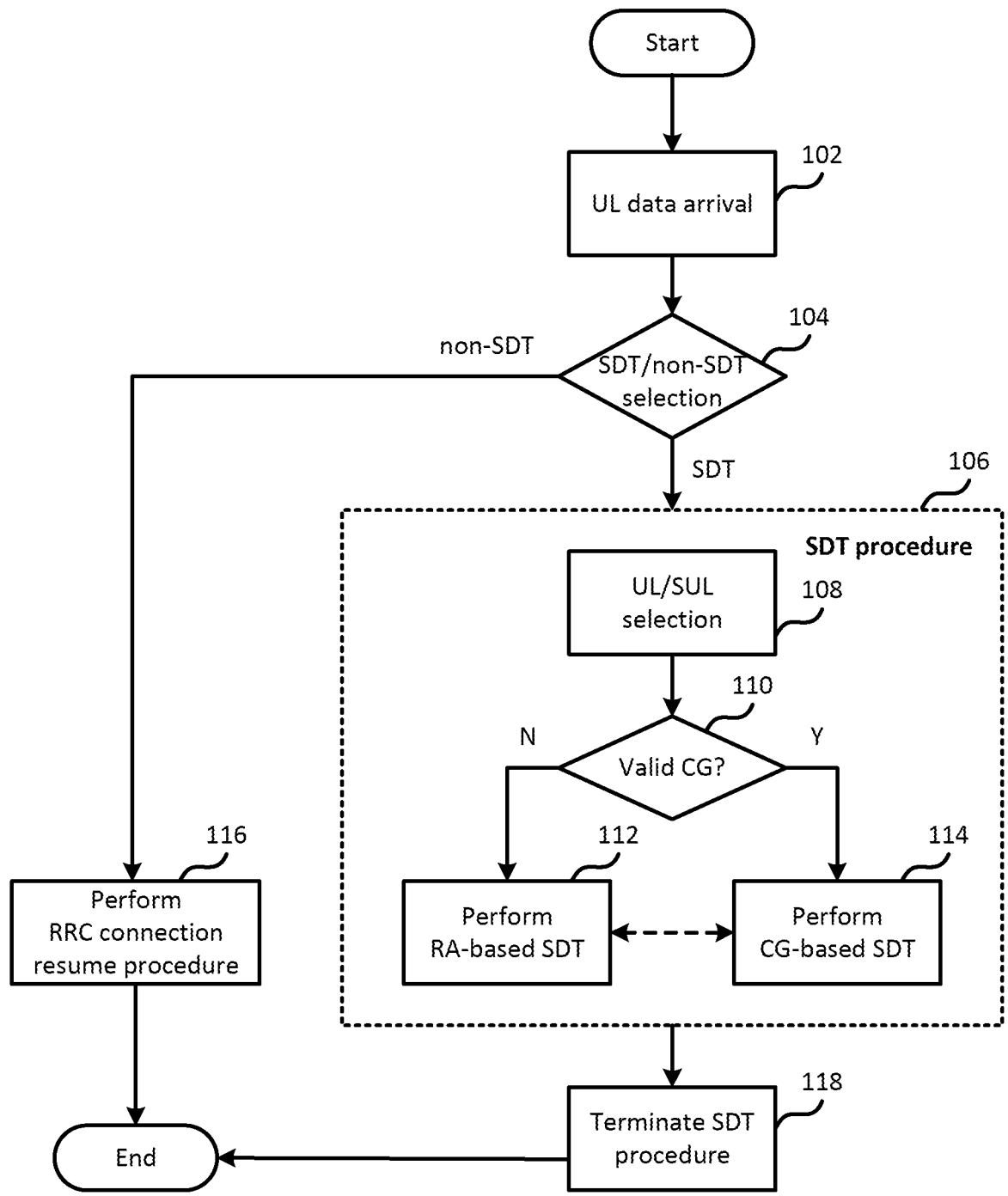
FIG. 1 is a flowchart illustrating an SDT procedure, according to an example implementation of the present disclosure.

Some of the acronyms used in the present application are defined as follows, unless otherwise specified:

| Acronym | Full name |
| --- | --- |
| 3GPP | 3$^{rd}$ Generation Partnership Project |
| 5G | 5$^{th}$ generation |
| 5GC | 5G Core |
| Alt | Alternative |
| ACK | Acknowledge |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CORESET | Control Resource Set |
| C-RNTI | Cell-Radio Network Temporary Identifier |
| CS | Cyclic Shift |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DMRS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Element |
| LCH | Logical Channel |
| LCP | Logical Channel Prioritization |
| MAC | Medium Access Control |
| MCG | Master Cell Group |
| MPE | Maximum Permissible Exposure |
| Msg | Message |
| NACK | Non-Acknowledge |
| NAS | Non-Access Stratum |
| NR | New Radio |
| NW | Network |
| NUL | Normal Uplink |
| PCell | Primacy Cell |
| PDCCH | Physical Downlink Control Channel |
| PDSCH | Physical Downlink Shared Channel |
| PDU | Protocol Data Unit |
| PHR | Power Headroom Reporting |
| PHY | Physical Layer |
| PRACH | Physical Random Access Channel |
| PRB | Physical Resource Block |
| PUCCH | Physical Uplink Control Channel |
| PUSCH | Physical Uplink Shared Channel |
| QCL | Quasi Co Location |
| RA | Random Access |
| RACH | Random Access Channel |
| RAR | Random Access Response |
| RB | Radio Bearer |
| Rel | Release |
| RLC | Radio Link Control |
| RNA | RAN notification area |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDT | Small Data Transmission |
| SDU | Service Data Unit |
| SI | System Information |
| SIB | System Information Block |
| SPS | Semi-Persistent Scheduling |
| SRB | Signaling Radio Bearer |
| SR | Scheduling Request |
| SRS | Sounding Reference Signal |
| SS | Search Space |
| SSB | SS/PBCH Block |
| SS-RSRP | Synchronization Signal-RSRP |
| SUL | Supplementary Uplink |
| TA | Timing Alignment or Time Advance |
| TAG | Timing Advance Group |
| TAT | Timing Alignment Timer |
| TCI | Transmission Configuration Indicator |
| TS | Technical Specification |
| Tx | Transmission |
| TBS | Transport Block Size |
| TRP | Transmission and Reception Point |
| UCI | Uplink Control Information |
| UE | User Equipment |
| UL | Uplink |
| USS | UE-specific Search Space |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), typically includes at least one base station (B S), at least one UE, and one or more optional network elements that provide connection within a network. The UE communicates with the network, such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

ABS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms used in this disclosure are provided, as follows.

User Equipment (UE): A UE may also be referred to as a PHY/MAC/RLC/PDCP/SDAP/RRC/AS/NAS layer/entity. The PHY/MAC/RLC/PDCP/SDAP/RRC/AS/NAS layer/entity may also be referred to as the UE.

Network (NW): An NW may include a network node, a TRP, a cell (e.g., SpCell, PCell, PSCell, and/or SCell), an eNB, a gNB, and/or a base station (BS).

Serving Cell: A serving cell may include a PCell, a PSCell, or an SCell. A serving cell may also include an activated or a deactivated serving cell.

Special Cell (SpCell): For a DC operation, an SpCell may be referred to as a PCell of an MCG or a PSCell of an SCG depending on whether the MAC entity (e.g., of the UE) is associated with the MCG or the SCG, otherwise, the SpCell may be referred to as the PCell.

Common/Dedicated configuration: A common configuration may be referred to as a cell-specific configuration, and a dedicated configuration may be referred to as a UE-specific configuration. The common parameters of an initial bandwidth part of a PCell may be provided via system information. For all other serving cells, the network may provide the common parameters via dedicated signaling.

The terms "RA-based SDT" and "RA-SDT" may be interchangeably used in some implementations of the present disclosure. The terms "CG-based SDT" and "CG-SDT" may be interchangeably used in some implementations of the present disclosure. The terms "initiate," "trigger," "apply," "store," "perform" and "start" may be interchangeably used in some implementations of the present disclosure. The terms "terminate," "stop," "release," "suspend," "discard," "end," "complete," "abort," and "cancel" may be interchangeably used in some implementations of the present disclosure. The terms "period," "process," "phase," and "duration" may be interchangeably used in some implementations of the present disclosure. The terms "resource," "occasion," and "configuration" may be interchangeably used in some implementations of the present disclosure. The terms "ongoing," "running," and "pending" may be interchangeably used in some implementations of the present disclosure. The terms "beam," "SSB," and "CSI-RS" may be interchangeably used in some implementations of the present disclosure. The terms "select," "consider" and "determine" may be interchangeably used in some implementations of the present disclosure.

Small Data Transmission (SDT)

In NR, until 3GPP release 16 (Rel-16), an RRC_INACTIVE state may not support data transmission (e.g., UL data transmission on a PUSCH and/or DL data transmission on a PDSCH). Hence, the UE may have to resume the connection (e.g., transition to the RRC_CONNECTED state) for any DL reception and/or UL data transmission. The connection setup and subsequently release to the RRC_INACTIVE state may happen for each data transmission regardless of how small and infrequent the data packets are. This may result in unnecessary power consumption and signaling overhead. The signaling overhead for the RRC_INACTIVE state UEs due to transmission of small data packets may be a general problem and may become a critical issue as the number of UEs increases in NR, not only for network performance and efficiency, but also for the UE's battery performance. In general, any device that has intermittent transmission of small data packets in the RRC_INACTIVE state may benefit from enabling small data transmission in the RRC_INACTIVE state. The key enablers for small data transmission in NR, namely the RRC_INACTIVE state, 2-step RACH, 4-step RACH, and/or configured grant type-1 have already been specified as part of legacy.

A Small Data Transmission (SDT) may be a procedure that allows data transmission while the UE is remaining in the RRC_INACTIVE state (e.g., without transitioning to the RRC_CONNECTED state). The SDT may be enabled on a radio bearer (RB) basis and may be initiated by the UE only if (i) less than a configured amount of UL data awaits transmission across all radio bearers (e.g., SRBs and/or DRBs) for which SDT is enabled, (ii) measured RSRP in the cell is above a configured threshold, and (iii) a valid resource for SDT is available.

An SDT procedure may be configured to either take place on the RACH (e.g., RA-based SDT, and configured via system information) or via type 1 CG resources (e.g., CG-based SDT, and configured via dedicated signaling in RRC Release message). The SDT resources may be configured on the initial BWP or for CG, additionally, on a dedicated BWP. For RACH, the network may also configure whether the 2-step or 4-step RA types can be used. When both the 2-step and 4-step RA types can be used, the UE may select the RA type. When only the 2-step RA can be used, the SDT may only be initiated if the criteria to select a 2-step RA type is also met.

Once the SDT is initiated, an SDT procedure may last as long as (i) the UE is not explicitly directed to an RRC_IDLE state or an RRC_INACTIVE state (e.g., via an RRC Release message) or to an RRC_CONNECTED state (e.g., via an RRC Resume message), (ii) until cell re-selection, (iii) expiry of the SDT failure detection timer, or (iv) an RLC entity reaching a configured maximum retransmission threshold, otherwise, the UE may transition to the RRC_IDLE state.

After initialing the SDT transmission, subsequent transmissions may be handled differently depending on the type of resources configured. When the CG resources are used, the network may schedule a subsequent UL transmission using dynamic grants or the subsequent UL transmission may take place on the next CG resource occasions. The DL transmissions may be scheduled using dynamic assignments. When the RACH resources are used, the network may schedule subsequent UL and DL transmissions using dynamic grants and/or assignments, respectively, after the completion of the RA procedure.

FIG. 1 is a flowchart illustrating an SDT procedure, according to an example implementation of the present disclosure. In some implementations, the illustrated SDT procedure may be performed by the UE.

The UE may be in an RRC_INACTIVE state when the illustrated SDT procedure is initiated. Additionally, the UE may be configured with SDT configurations (e.g., via an information element (IE), such as the IE sdt-Config and/or the IE sdt-ConfigCommon). The SDT configurations may be configured via an RRC release message (and/or via a suspend configuration message), and/or via system information (e.g., SIB). The configuration(s) for SDT may include a RACH configuration (e.g., configured via the IE ra-SDT-config), a CG configuration (e.g., configured via the IE cg-SDT-config), configuration(s) for SRB/DRB used for SDT, DRB list (e.g., configured via the IE sdt-DRBList), and/or an SRB indication (e.g., configured via the IE SRB2Indication).

In action 102, UL data may be arrived at the UE for transmission. The received UL data may be associated with a specific DRB/SRB/LCH. The specific DRB/SRB/LCH may be configured for SDT. The specific DRB/SRB/LCH may be configured by a DRB list (e.g., via the IE sdt-DRBList) and/or an SRB indication (e.g., via the IE SRB2Indication). Then the UE may initiate (or resume) a procedure for SDT (e.g., an SDT procedure).

The UE (e.g., a MAC entity of the UE) may be configured (e.g., via RRC signaling or through a SIB) with the SDT configuration, and an SDT procedure may be initiated (e.g., by the RRC layer and/or the MAC layer) by the UE. The SDT may be performed either via an RA procedure with the 2-step RA type or the 4-step RA type (e.g., RA-SDT) or via a configured grant type 1 (e.g., CG-SDT). For the SDT procedure, the UE (e.g., the MAC entity of the UE) may consider the radio bearers configured with SDT which are suspended for data volume calculation.

In action 104, the UE may determine whether to start an SDT procedure 106 (e.g., initiate the SDT procedure, initiate an RA procedure for SDT, and/or initiate an SDT procedure with CG), or initiate a non-SDT procedure (e.g., an RRC connection resume procedure) 116, (e.g., by initiating an RA procedure for a CCCH logical channel). The UE may determine whether to initiate an SDT procedure 106 or initiate a non-SDT procedure 116 based on one or more criteria (e.g., DRB/SRB, data volume, and/or RSRP).

In some implementations, the UE may initiate the SDT procedure when/after at least one LCH/DRB/SRB is configured for SDT, and the at least one LCH/DRB/SRB has pending data. For example, the data may be available for transmission for LCHs/DRBs/SRBs for which the SDT is enabled. The LCH/DRB/SRB configured for SDT may be resumed/re-established when the UE initiates the SDT procedure. The UE may initiate the RRC connection resume procedure when/after at least one LCH/DRB/SRB is not configured for SDT, and the at least one LCH/DRB/SRB has pending data. In some implementations, the UE may initiate the SDT procedure if data volume for transmission (e.g., for SDT) is lower than a (configured) threshold for SDT. The data volume may count the (total) volume of the LCHs/DRBs/SRBs configured for SDT. The UE may initiate an RRC connection resume procedure if the data volume for transmission (e.g., for SDT) is higher than a (configured) threshold for SDT. In some implementations, the UE may initiate the SDT procedure if an RSRP is larger than a configured RSRP threshold for SDT. The UE may initiate an RRC connection resume procedure if an RSRP is lower than a configured RSRP threshold for SDT.

In action 106, there may be two types of the SDT procedure. One type may be based on the RA procedure (e.g., 2-step RA or 4-step RA). The SDT based on the RA procedure may be referred to as the RA-based SDT 112 (or may also be referred to as the RA-SDT). The other type may be based on the CG (e.g., type 1 CG). The SDT based on the CG may also be referred to as the CG-based SDT 114 (or may also be referred to as the CG-SDT). The UE may transmit the UL data (e.g., small data), via an Msg3, an MsgA, a CG resource, and/or one or more PUSCH resources, during the SDT procedure.

In action 108, the UE may perform UL carrier selection (e.g., if SUL is configured in the cell, the UL carrier may be selected based on the RSRP threshold). After the UL carrier selection, the UE may perform the SDT procedure on the selected UL carrier (e.g., either UL or SUL).

Table 1 below shows an example of an SDT procedure.

TABLE 1

The UE/MAC entity may:
1> if the data volume of the pending UL data accorss all logical channels configured for Small Data Transmission is less or equal than sdt-DataVolumeThreshold:
   2> if the Serving Cell for Small Data Transmission is configured with supplementary uplink as specified in the 3GPP TS 38.331; and
   2> if the RSRP of the downlink pathloss reference is less than sdt-RSRP-ThresholdSSB-SUL:
      3> select the SUL carrier.
   2> else:
      3> select the NUL carrier.
   2> if the RSRP of the downlink pathloss reference is higher than sdt-RSRP-Threshold, if configured:
      3> if configured grant type 1 is configured for Small Data Transmission, and the configured grant type 1 resource is valid:
         4> initiate Small Data Transmission with configured grant type 1 on the selected UL carrier;
         4> indicate to the upper layer that conditions for initiating Small Data Transmission are fulfilled.
      3> else if Random Access Resources are configured for Small Data Transmission:
         4> initiate Random Access procedure on the selected UL carrier for Small Data Transmission;
         4> indicate to the upper layer that conditions for initiating Small Data Transmission are fulfilled.
      3> else:
         4> initiate Random Access procedure for CCCH logical channel (e.g., not for Small Data Transmission);
   2> else:
      3>initiate Random Access procedure for CCCH logical channel (e.g., not for Small Data Transmission);
1> else:
   2> initiate Random Access procedure for CCCH logical channel (e.g., not for Small Data Transmission);

In action 110, the UE may determine whether a CG resource/configuration is valid (during the SDT procedure) based on one or more of the following criteria.

The UE may determine whether a CG resource/configuration is valid based on whether an associated beam is valid. Determining whether the associated beam is valid or not may be based on an RSRP threshold. The RSRP threshold may be configured in the RRC release message and/or the CG configuration. If there is at least one beam with RSRP above the RSRP threshold, the UE may determine that the CG resource/configuration is valid. If there is no beam with RSRP above the RSRP threshold, the UE may determine that the CG resource/configuration is not valid.

The UE may also determine whether a CG resource/configuration is valid based on whether the TA is valid. For example, the UE may determine that the CG resource/configuration is valid during the time that the TA is valid. If the TA is not valid (e.g., expired), the UE may determine that the CG resource/configuration is not valid. Whether a TA is valid may be based on a TA timer. For example, the UE may determine that the TA is valid while the TA timer is running. The UE may determine that the TA is not valid when the TA timer is not running. The (parameter of) TA timer may be configured in the RRC release message and/or the CG configuration. Whether a TA is valid may also be based on an RSRP change volume. For example, the UE may determine that the TA is not valid if the RSRP change volume is higher than a threshold. The threshold (for RSRP change volume) may be configured in the RRC release message and/or the CG configuration.

Table 2 below shows an example of validation for an SDT using the CG.

TABLE 2

The UE may consider the time alignment value for Small Data Transmission using configured grant type 1 to be valid when the following conditions are fulfilled:
   1>   compared to the stored downlink pathloss reference RSRP value, the RSRP has not increased by more than cg-SDT-RSRP-ChangeThresholdIncrease, if configured; and
   1>   compared to the stored downlink pathloss reference RSRP value, the RSRP has not decrease by more than cg-SDT-RSRP-ChangeThresholdDecrease, if configured The UE may determine whether a CG resource is valid based on whether the CG configuration is valid. In some implementations, when the CG resource configuration is (re)initialized, the CG resource configuration may be determined as being valid, otherwise the CG resource configuration may be determined as being invalid. The CG resource configuration may be configured in the RRC release message.

The UE may also determine whether a CG resource/configuration is valid based on whether a timer (e.g., an SDT failure detection timer) is running or not. In some implementations, the timer may be configured in the RRC release message and/or the CG configuration. The UE may determine that the CG resource/configuration is valid while the timer is running, otherwise the CG resource/configuration is not valid. Such a timer may be used, in some implementations, to detect the failure of the SDT. The timer may be (re)started upon transmission of UL data when the UE is in the RRC_INACTIVE state. The timer may also be (re) started upon transmission of small data, or upon transmission of an RRC resume request. Additionally, the timer may be stopped upon reception of an RRCResume, RRC Setup, RRCRelease, or an RRCRelease with suspendConfig, or an RRCReject message. The timer may also be stopped during a cell re-selection or upon abortion of a connection establishment by the upper layers. When the timer expires, the UE may transition to the RRC_IDLE state (e.g., with a specific RRC resume cause).

Returning to FIG. 1, if the UE determines, in action 110, that the CG resource/configuration is not valid (e.g., one of the criteria for CG validity is not satisfied), the UE may perform, in action 112, an RA-based SDT procedure. For example, the UE may initiate an RA procedure (e.g., for SDT). The RA procedure may be either a 2-step or a 4-step type based on what the UE selects (e.g., according to an RSRP threshold). The UE may perform the transmission of the RA preamble (e.g., via the preamble/RA resource/PRACH resource which is configured for the SDT). The UE may perform the UL transmission (e.g., small data) via an Msg3/MsgA.

On the other hand, if the UE determines, in action 110, that the CG is valid (e.g., one or more criteria for the CG validity are satisfied), the UE may perform, in action 114, a CG-based SDT procedure. For example, the UE may perform the UL transmission (e.g., for small data) via a CG resource.

Additionally, if the criteria (e.g., DRB/SRB, data volume, and/or RSRP), in action 104, for initiating the SDT procedure is not satisfied, the UE may initiate, in action 116, a non-SDT procedure (e.g., RRC connection resume procedure). For example, the UE may initiate an RA procedure for a CCCH logical channel.

In action 118, the SDT procedure may be terminated/stopped/completed, for example, after receiving an indication from the NW (e.g., via RRC release message), or via a timer (e.g., an SDT failure detection timer expires), and/or by a counter (e.g., the value of the counter reaches a maximum value).

In some implementations, the SDT procedure may fallback/switch to the non-SDT procedure (e.g., an RRC connection resume procedure). For example, when the UE receives an indication (e.g., a fallback indication via an RRC resume/RRC release message) from the NW, the UE may stop/terminate/complete the SDT procedure and then may initiate an RRC connection resume procedure. If the initial UL transmission (e.g., in MsgA/Msg3/CG resources) fails a (configured) number of times, the UE may stop/terminate/complete the SDT procedure and then may initiate an RRC connection resume procedure. While an RA procedure of an RA-based SDT is ongoing and the condition to fallback/switch to the non-SDT procedure (e.g., RRC connection resume procedure) is satisfied, the UE may switch the RA type of the RA procedure from a 4-stepRA-SDT/2-stepRA-SDT type to a 4-stepRA/2-stepRA type.

Figure 2:
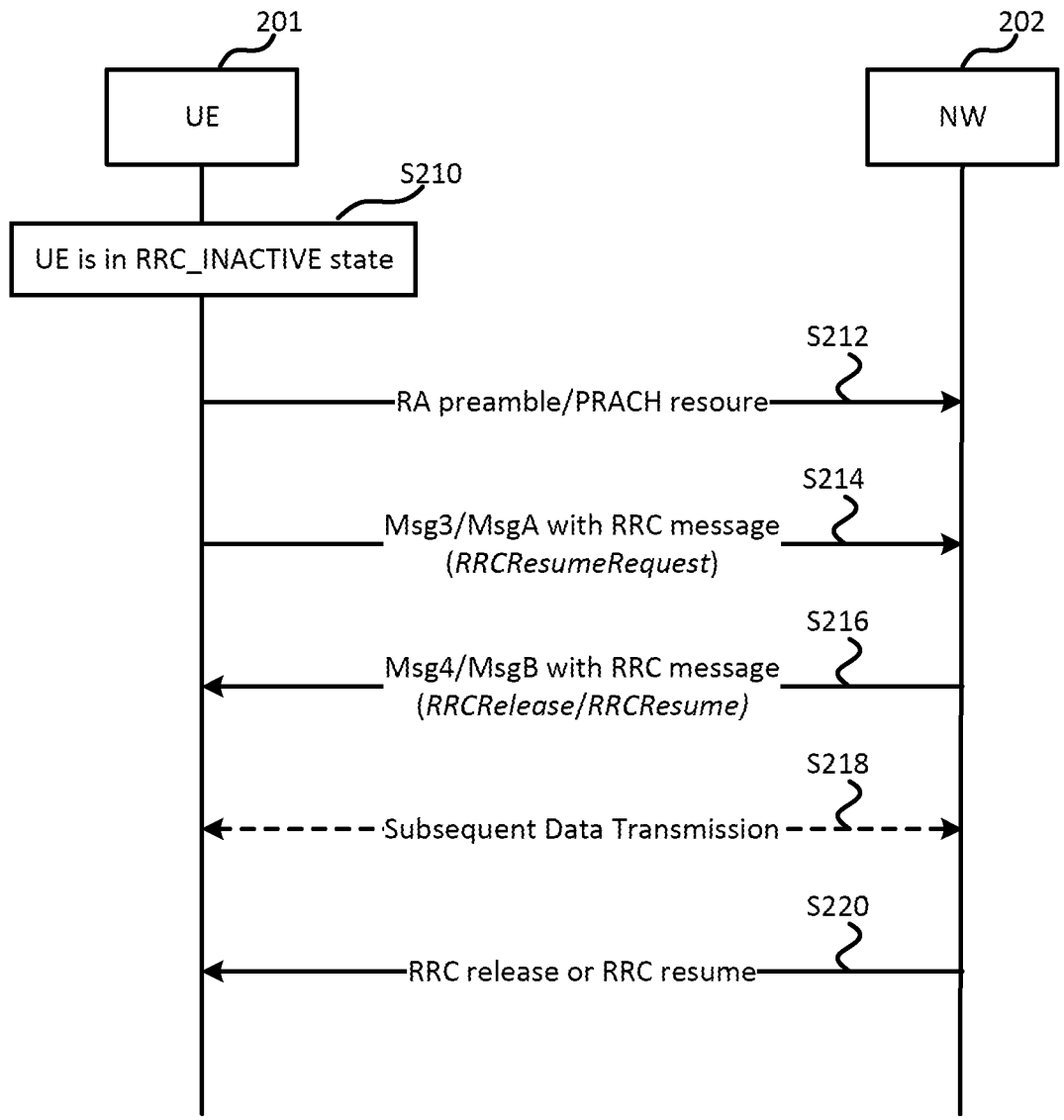
FIG. 2 is a diagram illustrating a Random Access (RA)-based SDT procedure, according to an example implementation of the present disclosure.

FIG. 2 is a diagram illustrating an RA-based SDT procedure, according to an example implementation of the present disclosure.

FIG. 2, as shown illustrate communications between the UE 201 and the NW 202. In action S210, the UE 201 may be in an RRC_INACTIVE state.

Next, in action S212, when the UE 201, in the RRC_INACTIVE state, has UL data available for transmission and/or an SDT procedure has been initiated, the UE 201 may initiate an RA-based SDT procedure for the transmission of the UL data (e.g., in a case that the CG is considered as not valid). The UE 201 may select either the 4-step RA type or the 2-step RA type. The preamble/PRACH resource for the RA-based SDT procedure (e.g., RA preamble/PRACH resource configured for SDT) and the normal RA procedure (e.g., RA preamble not configured for SDT) may be different. Here, the UE 201 may select the preamble/PRACH resource configured for SDT.

In action S214, after transmitting the RA preamble, the UE 201 may transmit an RRC message (e.g., a CCCH message), MAC CE(s), and/or UL data through an Msg3 (e.g., when the 4-step RA type is selected) or an MsgA (e.g., when the 2-step RA type is selected). The RRC message may be an RRCResumeRequest message. In addition to the RRC message, MAC CE (e.g., BSR), and UL data (e.g., data associated with DRB(s) for SDT) may be included in the Msg3/MsgA as well.

In action S216, once the Msg3/MsgA is transmitted, the UE 201 may monitor Temporary C-RNTI/C-RNTI/RA- RNTI/MSGB-RNTI for Msg4/MsgB, in which the contention resolution ID may be carried. In addition, the NW 202 may transmit an RRC message in an Msg4/MsgB. The RRC message may be an RRC Release message (e.g., with suspendConfig IE) or an RRC Resume message. The UE 201 may stay in the RRC_INACTIVE state if the UE 201 receives an RRC Release message (e.g., with suspendConfig IE) or transitions to the RRC_CONNECTED state, for example, if the UE 201 receives an RRC Resume message.

In action S218, once the RA procedure for SDT is successfully completed, the UE 201 may monitor a specific RNTI (e.g., C-RNTI) on a specific search space for subsequent data transmission. The subsequent data transmission may be the transmission of multiple UL and/or DL data packets as part of the SDT procedure without transitioning to the RRC_CONNECTED state (e.g., while the UE 201 may still be in the RRC_INACTIVE state). The UE 201 may monitor a PDCCH via a specific RNTI (e.g., C-RNTI) to receive the dynamic scheduling for the UL and/or DL new transmissions with/without the following (HARQ/ARQ) retransmissions (if there is any). The UE 201 may monitor a PDCCH via a UE specific RNTI (e.g., C-RNTI) to receive the dynamic scheduling for the retransmission of the UL data via a CG resource.

In action S220, the NW 202 may send an RRC release message (e.g., with suspendconfig) to keep the UE 201 in the RRC_INACTIVE state, or to move the UE to the RRC_IDLE state. The NW 202 may send an RRC resume message to move the UE 201 to the RRC_CONNECTED state. Once the RRC Release message (e.g., with suspendConfig IE) is received, the UE 201 may terminate the SDT procedure based on the RRC Release message, and/or may stop monitoring the C-RNTI, and/or may stay in the RRC_INACTIVE state.

Figure 3:
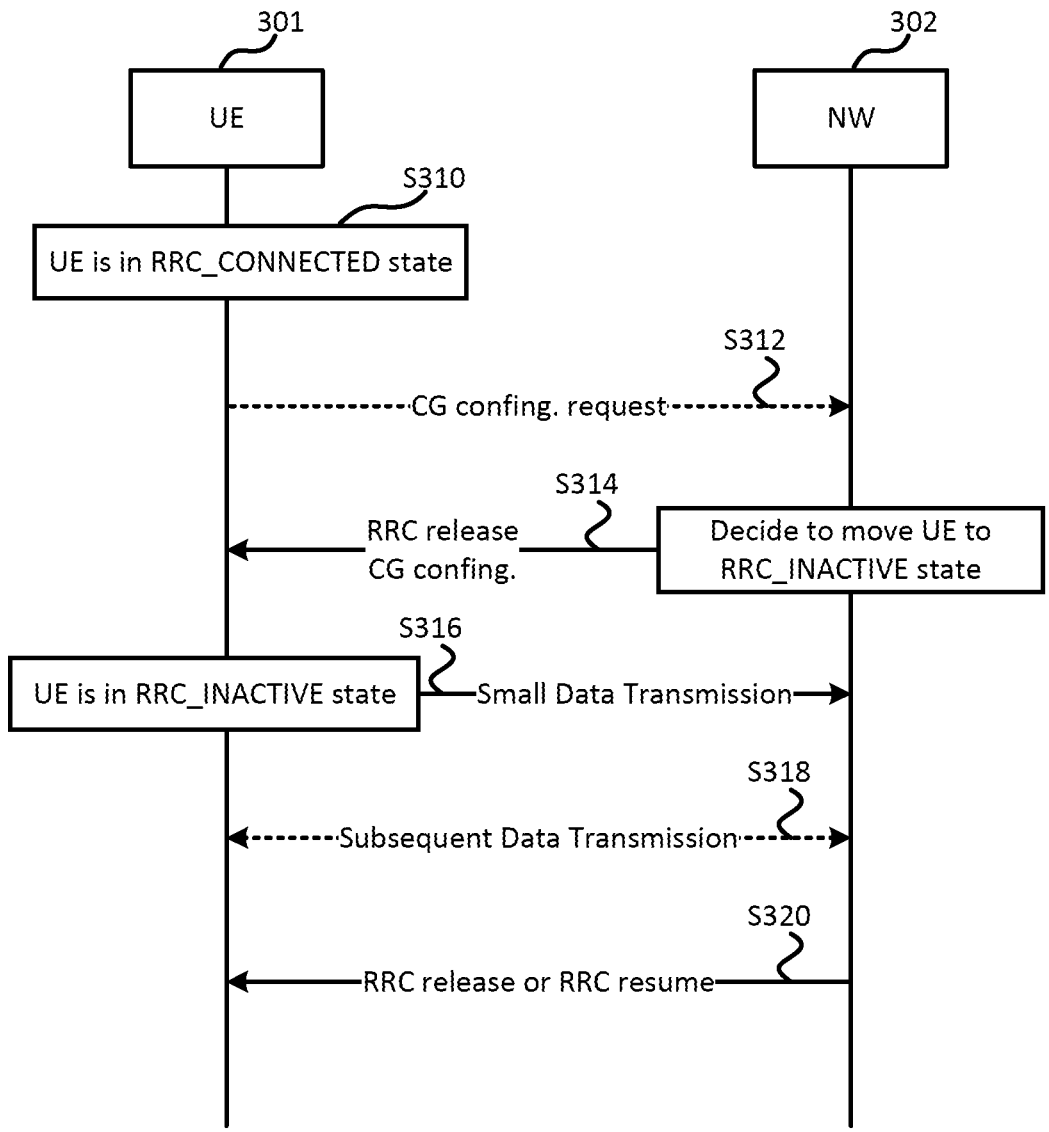
FIG. 3 is a diagram illustrating a Configured Grant (CG)-based SDT procedure, according to an example implementation of the present disclosure.

FIG. 3 is a diagram illustrating a CG-based SDT procedure, according to an example implementation of the present disclosure.

FIG. 3, as shown illustrate communications between the UE 301 and the NW 302. In action S310, the UE 301 may be in an RRC_CONNECTED state.

Next, in action S312, when the UE 301 is in the RRC_CONNECTED state or the RRC_INACTIVE state, the UE 301 may send a CG configuration request to the NW 302 to indicate its preference on CG configuration for small data and/or for the RRC_INACTIVE state.

In action S314, the NW 302 may decide to move the UE 301 to the RRC_INACTIVE state by sending an RRC Release message (e.g., including suspendconfig IE) to the UE 301. The RRC release message may include at least one CG configuration to configure the CG resources to the UE 301. The CG configuration may include, but is not limited to, a CG periodicity, a TBS, a number for the implicit release of the CG resources, a CG Timer, a retransmission timer, a number of HARQ processes reserved for the CG in SDT, an RSRP threshold for SSB selection and association between the SSB and CG resources, and TA related parameters (e.g., cg-SDT-TimeAlignmentTimer).

In action S316, the UE 301 may perform the SDT procedure based on the CG resources (e.g., in the RRC_INACTIVE state) according to the CG configuration (e.g., configured in S314). For example, the UE 301 may transmit UL data (e.g., small data) via the CG resource (e.g., during the SDT procedure).

In action S318, subsequent data transmission may be a transmission of multiple UL and/or DL packets, as part of the SDT procedure without transitioning to the RRC_CONNECTED state (e.g., the UE 301 may still be in the RRC_INACTIVE state). The UE 301 may monitor a PDCCH via a specific RNTI (e.g., C-RNTI, CS-r, and/or an SDT RNTI) on a search space (e.g., configured by a CG configuration) to receive dynamic scheduling for new UL and/or DL transmissions with/without following (AHRQ/ARQ) retransmissions (if there is any). The UE 301 may monitor a PDCCH via the specific RNTI to receive the dynamic scheduling for the retransmission of the CG. The UE 301 may also perform a subsequent data transmission via a CG resource according to the CG configuration (e.g., configured in S314).

In action S320, the NW 302 may send an RRC release (with suspendconfig) message to keep the UE 301 in the RRC_INACTIVE state or to move the UE 301 to the RRC_IDLE state. The NW 302 may send an RRC resume message to move the UE 301 to the RRC_CONNECTED state. Once the RRC Release message (e.g., with suspendConfig IE) is received, the UE 301 may terminate the SDT procedure based on the RRC Release message, and/or may stop monitoring the specific RNTI, and/or may stay in the RRC_INACTIVE state.

Figure 4:
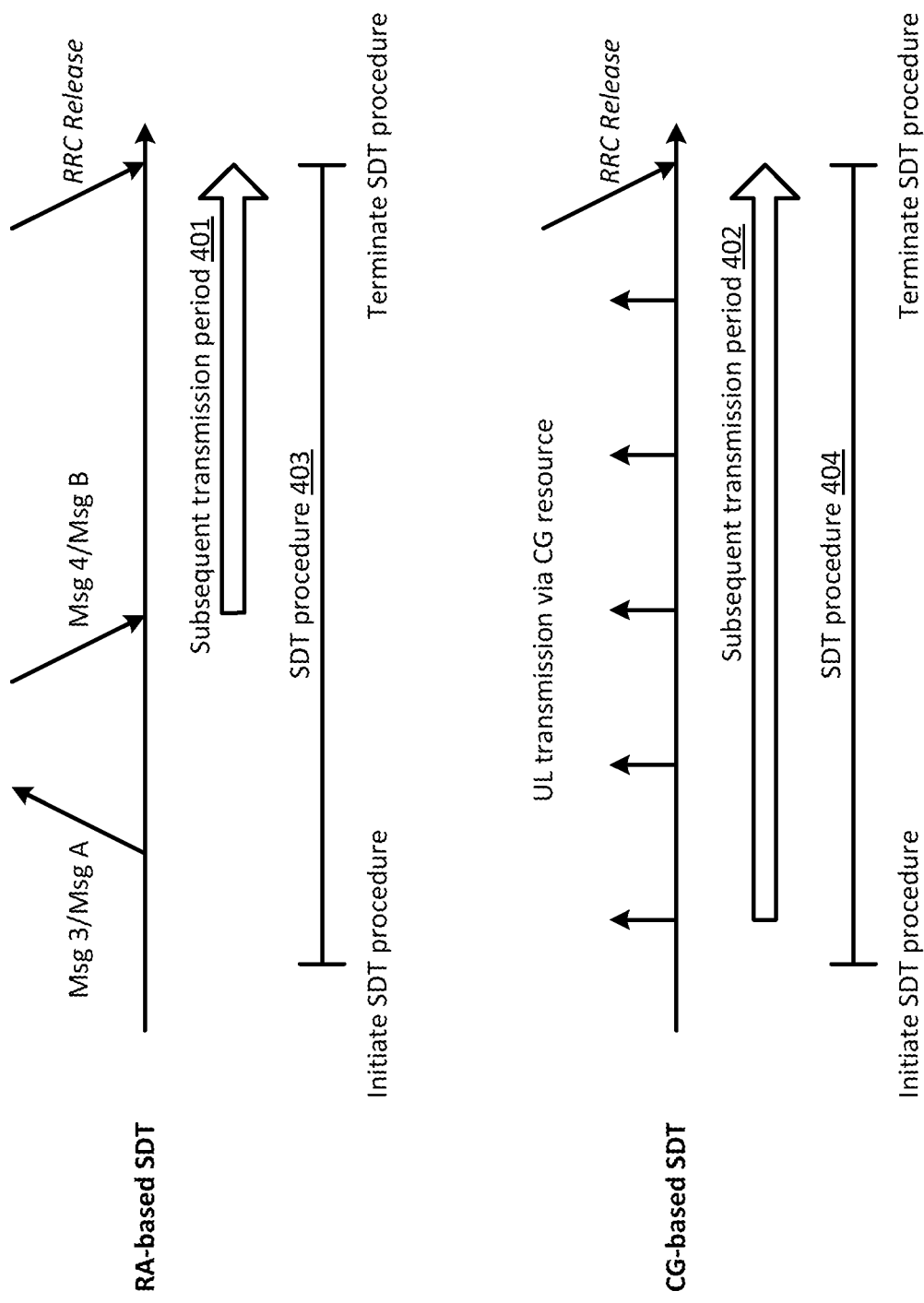
FIG. 4 is a schematic diagram illustrating a subsequent transmission period (or subsequent transmission phase) of an SDT procedure, according to an example implementation of the present disclosure.

FIG. 4 is a schematic diagram illustrating a subsequent transmission period (or subsequent transmission phase) of an SDT procedure, according to an example implementation of the present disclosure.

The subsequent transmission period 401 may be determined as a time period during an RA-based SDT procedure 403. The subsequent transmission period 402 may be determined as a time period during a CG-based SDT procedure 404. For example, the subsequent transmission periods 401, 402 may be time periods during which the SDT procedures 403, 404, respectively, are ongoing. For example, the subsequent transmission period 402 may be a time period while a CG configuration is configured, or after the CG configuration is initiated (e.g., and the CG configuration is not released).

In some implementations, the subsequent transmission period 401 may be determined as started when/after the UE initiates the SDT procedure 403. The subsequent transmission period 402 may be determined as started when/after the UE initiates the SDT procedure 404.

In some implementations, the subsequent transmission period 401 may be determined as started when/after the UE considers a contention resolution is successful for an RA procedure and/or after the UE considers the RA procedure as being successfully completed. The RA procedure may be an RA-based SDT. The RA procedure may be initiated for the SDT.

In some implementations, the subsequent transmission period 402 may be determined as started when/after the CG configuration is configured/(re)initialized. The CG configuration may include a parameter which may be used to indicate the SDT scheduling.

In some implementations, the subsequent transmission period 402 may be determined as started when/after the CG configuration is considered as valid.

In some implementations, the subsequent transmission periods 401, 402 may be determined as started when/after the UE transmits a UL message. The UL message may be transmitted via an Msg1/Msg3/MsgA/CG resource/UL resource scheduled by Msg2/MsgB/Msg4 (e.g., during the SDT procedures 403, 404) or on an UL resource that is (pre)configured as part of the SDT configuration. The UL message may include an RRC resume request message (e.g., RRCResumeRequest, RRCResumeRequest1, and/or a CCCH message for SDT). The UL message may include small data (e.g., UL data associated with a specific SRB/DRB/LCH for SDT). The UL message may include a MAC CE (e.g., a BSR MAC CE).

In some implementations, the subsequent transmission periods 401, 402 may be determined as started when/after the UE receives a response from the NW. The response may be an Msg2/Msg4/MsgB and/or a response for a UL transmission via a CG resource. The response may be used for contention resolution (e.g., for an RA procedure). The response may include an (HARQ/RRC) ACK/NACK message, and/or a DFI, for example, for (the first) UL transmission via the CG resource. The response may contain a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for CG). The response may indicate a UL grant for a new transmission for the HARQ process used for the transmission of an UL transmission for small data (e.g., a UL message). The response may include a specific command (e.g., a TA command MAC CE). The response may include an RRCResume, RRCSetup, RRCRelease, RRCRelease with SuspendConfig, RRCReestablishment, RRCReconfiguration, and/or an RRCReject.

In some implementations, the subsequent transmission period 401 (and/or the SDT procedure 403) may be terminated/stopped when/after the SDT procedure 403 is terminated. The subsequent transmission period 402 (and/or the SDT procedure 404) may be terminated/stopped when/after the SDT procedure 404 is terminated.

In some implementations, the subsequent transmission period 402 (and/or the SDT procedure 404) may be terminated/stopped when/after the CG configuration is released/suspended/cleared.

In some implementations, the subsequent transmission period 402 (and/or the SDT procedure 404) may be terminated/stopped when/after the CG configuration is considered as invalid.

In some implementations, the subsequent transmission periods 401, 402 (and/or the SDT procedures 403, 404) may be terminated/stopped when/after the UE receives an indication from the NW. The indication may include an RRCResume, an RRCSetup, an RRCRelease, an RRCRelease with SuspendConfig, RRCReestablishment, and/or an RRCReject. The indication may be a PDCCH addressed to an RNTI (e.g., a C-RNTI, a CS-RNTI, a dedicated RNTI, an RNTI for SDT, and/or an RNTI for CG). The indication may indicate to the UE to terminate the SDT procedures 403, 404 and/or the subsequent transmission periods 401, 402 (e.g., via a field included in the indication). The indication may indicate to the UE to initiate an RRC procedure (e.g., an RRC connection resume procedure, an RRC establishment procedure, and/or an RRC reestablishment procedure). The indication may indicate to the UE to switch/fallback the types for SDT (e.g., the types may be an RA-based SDT, a CG-based SDT, a 2-step RA, or a 4-step RA). The indication (with a specific value, e.g., TRUE or FALSE) may be included in system information (e.g., a SIB) to indicate that the CG transmission in the RRC_INACTIVE state is no longer supported in the cell. For example, when the UE receives the indication (with a specific value, e.g., TRUE or FALSE), the UE may release/suspend the CG configuration(s).

In some implementations, the subsequent transmission periods 401, 402 (and/or the SDT procedures 403, 404) may be terminated/stopped when/after a timer expires. The timer may be an SDT failure/problem detection timer. The timer may be specifically configured for the SDT. The value of the timer may be configured via an RRC release message. The value of the timer may be configured via the RRC release message with suspend configuration. The value of the timer may be configured via a configuration for SDT. The value of the timer may be configured via a RACH configuration for SDT. The value of the timer may be configured via a CG configuration for SDT. The value of the timer may be configured via the IE UE-TimersAndConstants. The value of the timer may be configured via system information (e.g., a SIB). The timer may be a TA timer, ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, drx-RetransmissionTimerUL, T300, T301, T302, T304, T310, T311, T312, T316, T319, T320, T321, T322, T325, T330, T331, T342, and/or T345. The timer may be used for monitoring a response (e.g., for ACK/NACK). The timer may be a response window. The timer may be used for receiving a PDCCH/scheduling (e.g., for new transmission or retransmission) from the NW.

In some implementations, the subsequent transmission periods 401, 402 may be terminated/stopped when/after the UE enters an RRC_IDLE state or an RRC_CONNECTED state (e.g., from the RRC_INACTIVE state). In some implementations, the subsequent transmission periods 401, 402 may be terminated/stopped/released when/after the UE performs a cell selection/reselection. In some implementations, the subsequent transmission periods 401, 402 may be terminated/stopped upon the abortion of a connection establishment, for example, by the upper layers. In some implementations, the subsequent transmission periods 401, 402 may be terminated/stopped upon a RAN notification area (RNA) update. In some implementations, the subsequent transmission periods 401, 402 may be terminated/stopped when/after the UE establishes/resumes an RRC connection from the RRC_INACTIVE state on a cell different from the cell where the CG configuration was provided. In some implementations, the subsequent transmission periods 401, 402 may be terminated/stopped when/after the UE initiates an RRC re-establishment procedure. For example, the subsequent transmission periods 401, 402 may be terminated/stopped after the UE sends an RRCReestablishmentRequest to the network. In some implementations, the subsequent transmission periods 401, 402 may be terminated/stopped when/after the UE is indicated, by the network, to perform a carrier switching (e.g., from NUL to SUL or vice versa). In some implementations, the subsequent transmission periods 401, 402 may be terminated/stopped when/after the UE is indicated, by the network, to perform a (UL/DL) BWP switching.

In the subsequent transmission periods 401, 402, the UE may need to monitor the PDCCH (e.g., to receive the possible (DL and/or UL) scheduling from the NW). The UE may monitor the PDCCH (e.g., during the SDT procedures 403, 404 and/or during the subsequent transmission periods 401, 402) based on a search space, a CORESET, and/or an RNTI. For example, the UE may monitor the PDCCH addressed to the C-RNTI after a successful completion of the RA procedure for SDT.

The Search Space (SS) may be at least one of the following (a) and (b).

(a): Common Search Space (CSS) (set): In some implementations, the CSS (set) may be the common search space(s) (set) configured in the PDCCH-ConfigCommon, the type-1 PDCCH CSS (set) configured by ra-SearchSpace, the type-3 PDCCH CSS (set), the search space zero, a new CSS (set)configured via system information (e.g., a SIB) or an RRC release message, and/or a search space (set) with parameters of the search space(s) (set) configured in the initial BWP.

(b): UE-specific Search Space (set) (USS (set)): In some implementations, the USS (set)may be a USS (set)configured via an RRC Release message, a USS (set) configured via an Msg4/MsgB, a USS (set)configured via a PDCCH-Config, a USS (set)configured via a configuration(s) for SDT, a search space (set) with an ID other than 0-39, and/or a search space (set)identified as specific set for SDT.

The CORESET may be at least one of the following (a) and (b).

(a): common CORESET: In some implementations, the common CORESET may be CORESET 0, or a CORESET other than CORESET 0.

(b): UE-specific CORESET configuration: In some implementations, the UE-specific CORESET configuration may be a UE-specific CORESET configured via an RRC Release message, a UE-specific CORESET configured via an Msg4/MsgB, a UE-specific CORESET configured via a configuration(s) for SDT, a CORESET with an ID other than 0-14.

The RNTI may include a C-RNTI, a CS-RNTI, an SDT-RNTI, an RNTI for SDT, an RNTI for CG.

The UE may have an uplink rate control function which may manage the sharing of uplink resources between logical channels. The RRC may control the uplink rate control function by giving each logical channel a priority, a prioritized bit rate (PBR), and a buffer size duration (BSD). In addition, mapping restrictions for the LCH may be configured.

The uplink rate control function may ensure that the UE serves the logical channel(s) in the following sequence: (i) all relevant logical channels in a decreasing priority order up to their PBR; (ii) all relevant logical channels in a decreasing priority order for the remaining resources assigned by the grant.

In case the PBRs are all set to zero, the first step (i) as described above, may be skipped, and the logical channels may be served in a strict priority order (e.g., the UE may maximize the transmission of higher priority data). The mapping restrictions indicate to the UE which logical channels are relevant for the grant received. If no mapping restrictions are configured, all logical channels may be considered.

If more than one logical channel has the same priority, the UE may serve them equally. A MAC entity/UE may perform priority handling between logical channels of one UE by means of a logical channel prioritization. A single MAC entity may support multiple numerologies, transmission timings and cells. Mapping restrictions in a logical channel prioritization may control which numerology(ies), cell(s), and transmission timing(s), a logical channel may be able to use.

The Logical Channel Prioritization (LCP) procedure may be applied whenever a new transmission is performed. The NW/RRC may control the scheduling of uplink data by signaling for each logical channel (e.g., per MAC entity). The signaling may include the following (a)-(c).

(a) priority where an increasing priority value indicates a lower priority level.

(b) prioritisedBitRate which specifies the Prioritized Bit Rate (PBR).

(c) bucketSizeDuration which specifies the Bucket Size Duration (BSD).

The NW/RRC may additionally control the LCP procedure by configuring mapping restrictions for each logical channel. The mapping restrictions may include the following (a)-(f).

(a) allowedSCS-List which specifies the allowed Subcarrier Spacing(s) for transmission.

(b) maxPUSCH-Duration which specifies the maximum PUSCH duration allowed for transmission.

(c) configuredGrantType1Allowed which specifies whether a configured grant Type 1 can be used for transmission.

(d) allowedServingCells which specifies the allowed cell(s) for transmission.

(e) allowedCG-List which specifies the allowed configured grant(s) for transmission.

(f) allowedPHY-PriorityIndex which specifies the allowed PHY priority index(es) of a dynamic grant for transmission.

Table 3 below shows an example of the selection of logical channels.

TABLE 3

When a new transmission is performed, the MAC entity may:
  1> select the logical channels for each UL grant that satisfy all the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to true in case the UL grant is a Configured Grant Type 1; and
    2> allowedServingCells, if configured, includes the Cell information associated to the UL grant. Does not apply to logical channels associated with a DRB configured with PDCP duplication within the same MAC entity (e.g., CA duplication) when CA duplication is deactivated for this DRB in this MAC entity; and
    2> allowedCG-List, if configured, includes the configured grant index associated to the UL grant; and
    2> allowedPHY-PriorityIndex, if configured, includes the priority index (as specified in the 3GPP TS 38.213) associated to the dynamic UL grant.

The Subcarrier Spacing index, PUSCH transmission duration, Cell information, and priority index may be included in Uplink transmission information received from the lower layers for the corresponding scheduled uplink transmission.

LCH Configuration for SDT

In some implementations, a UE may be configured with an LCH configuration (e.g., LogicalChannelConfig). The LCH configuration may be configured in an RLC bearer configuration (e.g., RLC-BearerConfig) by mac-LogicalChannelConfig. The RLC bearer configuration may be received in an rlc-BearerToAddModList. The rlc-BearerToAddModList may be configured in a Cell Group configuration (e.g., CellGroupConfig). The LCH configuration may be used to configure the logical channel parameters. The RLC bearer configuration may be used to configure an RLC entity, a corresponding logical channel in the MAC entity and the linking to a PDCP entity (e.g., a served radio bearer). The Cell Group configuration may be used to configure a master cell group (MCG) or a secondary cell group (SCG). A cell group may include one MAC entity and a set of logical channels with associated RLC entities. A cell group may include a primary cell (SpCell) and one or more secondary cells (SCells).

The LCH configuration may include a first set of parameters for scheduling the UL data for each LCH (per MAC entity). For example, the first set of parameters may include at least one of the following (a)-(c).

(a) priority where an increasing priority value indicates a lower priority level.

(b) prioritisedBitRate which specifies the Prioritized Bit Rate (PBR).

(c) bucketSizeDuration which specifies the Bucket Size Duration (BSD).

The LCH configuration may include a second set of parameters for mapping restrictions for each logical channel (e.g., per MAC entity). For example, the second set of parameters may include at least one of the following (a)-(f).

(a) allowedSCS-List which specifies the allowed Sub carrier Spacing(s) for transmission.

(b) maxPUSCH-Duration which specifies the maximum PUSCH duration allowed for transmission.

(c) configuredGrantType1Allowed which specifies whether a configured grant Type 1 can be used for transmission.

(d) allowedServingCells which specifies the allowed cell(s) for transmission.

(e) allowedCG-List which specifies the allowed configured grant(s) for transmission.

(f) allowedPHY-PriorityIndex which specifies the allowed PHY priority index(es) of a dynamic grant for transmission.

Suspension of the RRC connection may be initiated by the network. When the RRC connection is suspended, the UE may store the UE Inactive AS Context and/or any configuration received from the network, and transition to the RRC_INACTIVE state. The RRC message to suspend the RRC connection may be integrity-protected and ciphered. The UE Inactive AS Context may be stored when the connection is suspended, and may be restored/applied when the connection is resumed.

In some implementations, upon reception of the RRC release message (e.g., including suspendConfig and/or SDT configuration) by the UE, the UE may store, in the UE Inactive AS Context, the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured), and all other parameters configured except for the following (a)-(d).

(a) parameters within ReconfigurationWithSync of the PCell.

(b) parameters within ReconfigurationWithSync of the NR PSCell, if configured.

(c) parameters within MobilityControlInfoSCG of the E-UTRA PSCell, if configured.

(d) servingCellConfigCommonSIB.

In some implementations, upon initiation of an SDT procedure and/or an RRC connection resume procedure for SDT, the UE may perform one or more of (but not limited to) the following actions (a)-(l).

(a) apply the default SRB configuration.

The default SRB configuration may include an LCH configuration for SRB(s). For example, the default SRB configuration and/or the LCH configuration for SRB(s) may include one or more of the following parameters (i)-(iii).

(i) The value of the priority configured for SRB1 may be 1, configured for SRB2 may be 3 (e.g., while SRB2 is (optionally) configured by the serving RAN, otherwise, SRB2 may or may not be configured in the default SRB configuration), and/or configured for SRB3 may be 1.

(ii) The value of the prioritisedBitRate (PBR) configured for SRB(s) may be infinity.

(iii) The value of the LCH group configured for SRB(s) may be 0.

(b) apply the default MAC Cell Group configuration.

(c) apply the CCCH configuration. The CCCH configuration may include an LCH configuration (for CCCH). For example, the CCCH configuration and/or the LCH configuration (for CCCH) may include one or more of the following parameters (i)-(iv).

(i) The value of the priority may be 1.

(ii) The value of the prioritisedBitRate (PBR) may be infinity.

(iii) The value of the LCH group configured for SRB(s) may be 0.

(iv) The value of the bucketSizeDuration (BSD) may be 1000 ms.

(d) apply the timeAlignmentTimerCommon included in SIB1.

In some implementations, the UE may apply a TA timer configuration included in an SDT configuration (e.g., rather than the timeAlignmentTimerCommon in SIB1, if it is broadcasted), an RA configuration for SDT, and/or a CG configuration for SDT.

(e) initiate transmission of the RRCResumeRequest message or RRCResumeRequest1 (e.g., which may be predefined in the default configuration, or it may depend on the UE's decision (e.g., based on DL-RSRP measurement result in the UE side)).

(f) re-establish PDCP entities for all the radio bearers (e.g., SRB and/or DRB) that are configured for SDT.

In some implementations, the UE may re-establish the PDCP entities/RLC entities associated with the radio bearers which trigger the SDT procedure or the radio bearers which have pending data applicable to SDT.

(g) re-establish the RLC entity for each of the RLC bearers with the servedRadioBearer configured for SDT.

(h) reconfigure the RLC entity in accordance with the stored rlc-Config for the RLC bearer for each of the RLC bearers with the servedRadioBearer configured for SDT.

In some implementations, if the suspendConfig includes sdt-Config, the UE may consider the DRB to be configured for SDT for each of the DRBs included in the sdt-DRBList. In some implementations, if sdt-SRB2Indication is included in the SDT configuration (e.g., the sdt-Config), the UE may consider that SRB2 is configured for SDT. In some implementations, if at least one DRB or the SRB2 is configured for SDT, the UE may consider that SRB1 is configured for SDT.

(i) resume all the radio bearers that are configured for SDT.

(j) perform a (intra-frequency/inter-frequency/inter-RAT) cell reselection procedure.

(k) stop performing a (intra-frequency/inter-frequency/inter-RAT) cell reselection procedure while the SDT procedure is running.

(l) perform a beam failure recovery procedure (or stop performing the beam failure recovery procedure while the SDT procedure is running).

In some implementations, the default SDT configuration (e.g., a default SRB configuration, or a default MAC cell group configuration) may be cell-specific (e.g., it may be transmitted by the serving cell via a common or specific configuration via broadcasting system information, e.g., SIB1, or UE-specific RRC signaling). In some implementations, the default SDT configuration may be UE-specific (e.g., the default SDT configuration may be transmitted by the serving cell via a dedicated configuration via UE-specific RRC signaling, e.g., an RRC release message and/or an SDT configuration). In some implementations, the UE may receive the default configuration while the UE is in the RRC_CONNECTED state/RRC_INACTIVE state.

In some implementations, when/after receiving an RRC release message (e.g., including a suspendConfig and/or an SDT configuration), or upon/after initiation of an SDT procedure and/or an RRC connection resume procedure for SDT, the UE may perform one or more (but not limited to) the following Actions (a)-(d).

Action (a): apply an LCH configuration for SDT. The LCH configuration for SDT may be a stored, default/common, and/or received/configured LCH configuration.

Action (b): apply a (default) MAC Cell Group configuration for SDT.

Action (c): apply a CCCH configuration for SDT.

Action (d): replace a parameter/IE(s) in the stored LCH configuration with a received/configured parameter/IE(s) in the LCH configuration for SDT.

In some implementations, the (stored) LCH configuration may be an LCH configuration configured by the BS when the UE is in the RRC_CONNECTED state. In some implementations, the (default/common) LCH configuration for SDT may be included in the (default) MAC Cell Group configuration for SDT, and/or in the CCCH configuration for SDT. In some implementations, the (default/common) LCH configuration for SDT may be pre-configured and/or may be as specified in the 3GPP technical specification (TS) (e.g., 3GPP TS 38.331).

In some implementations, the (stored) LCH configuration for SDT may be an LCH configuration stored upon reception of the RRC release message (e.g., including suspendConfig and/or SDT configuration). The (stored) LCH configuration for SDT may be an LCH configuration stored in the UE Inactive AS context. The (stored) LCH configuration for SDT may be an LCH configuration configured by the BS when the UE is in the RRC_CONNECTED state. The (stored) LCH configuration for SDT may be an LCH configuration stored by the UE when the UE is in the RRC_INACTIVE state. The (stored) LCH configuration may be used before the UE receives the RRC release message. For example, the (stored) LCH configuration may be used before the UE transitions to the RRC_INACTIVE state (e.g., while the UE is still in the RRC_CONNECTED state).

In some implementations, the (received/configured) LCH configuration for SDT may be an LCH configuration received/configured by an RRC release message (e.g., including suspendConfig and/or SDT configuration). The (received/configured) LCH configuration for SDT may be an LCH configuration included in an RRC release message, in a suspend configuration, and/or in an SDT configuration. The (received/configured) LCH configuration for SDT may be an LCH configuration included in an RA configuration for SDT and/or in a CG configuration for SDT.

In some implementations, the (received/configured) LCH configuration for SDT may be a common LCH configuration. The (received/configured) LCH configuration for SDT may be included in the system information (e.g., in SIB 1 or in other SI in the NR protocols). The (received/configured) LCH configuration for SDT may be included in a common SDT configuration (e.g., sdt-ConfigCommon).

In some implementations, the LCH configuration for SDT may include one or more parameters/IEs of a first set of parameters for scheduling the UL data for each LCH. For example, the first set of parameters may include at least one of the following (a)-(c).

(a) priority where an increasing priority value indicates a lower priority level.

(b) prioritisedBitRate which specifies the Prioritized Bit Rate (PBR).

(c) bucketSizeDuration which specifies the Bucket Size Duration (BSD).

In some implementations, the LCH configuration for SDT may include one or more parameters/IEs of a second set of parameters for the mapping restriction for each LCH. For example, the second set of parameters may include at least one of the following (a)-(f).

(a) allowedSCS-List which specifies the allowed Subcarrier Spacing(s) for transmission.

(b) maxPUSCH-Duration which specifies the maximum PUSCH duration allowed for transmission.

(c) configuredGrantType1Allowed which specifies whether a configured grant Type 1 can be used for transmission.

(d) allowedServingCells which specifies the allowed cell(s) for transmission.

(e) allowedCG-List which specifies the allowed configured grant(s) for transmission.

(f) allowedPHY-PriorityIndex which specifies the allowed PHY priority index(es) of a dynamic grant for transmission.

The priority, prioritisedBitRate, bucketSizeDuration, allowedSCS-List, maxPUSCH-Duration, configuredGrantType1Allowed, allowedServingCells, allowedCG-Li st, and/or allowedPHY-PriorityIndex may be specifically configured for SDT (and/or for an RRC_INACTIVE UE).

In some implementations, the LCH configuration for SDT may (only) include the first set of parameters for scheduling the UL data for each LCH. The LCH configuration for SDT may not include the second set of parameters for the mapping restriction for each LCH. The fields of the first set of parameters for scheduling the UL data for each LCH may be (mandatorily) presented. The fields of the second set of parameters for the mapping restriction for each LCH may be absent and/or optional.

In some implementations, the UE may only apply/store the first set of parameters for scheduling the UL data for each LCH (e.g., when the UE performs one or more Actions (a)-(d), as described above). The LCH configuration for SDT may not apply/store (or may ignore) the second set of parameters for the mapping restriction for each LCH (e.g., when the UE performs one or more Actions (a)-(d), as described above). In some implementations, the UE may only replace the first set of parameters for scheduling the UL data for each LCH with the parameter/IE(s) in the stored LCH configuration (e.g., when the UE performs one or more Actions (a)-(d), as described above)).

In some implementations, the LCH configuration for SDT may include the second set of parameters for the mapping restriction for each LCH. Only one or more (or any combination) of the parameters/IEs in the second set of parameters may be configured for the SDT. For example, the UE may only be configured with the configuredGrant-Type1Allowed and/or allowedCG-List in the LCH configuration for SDT. The fields of the configuredGrant-Type1Allowed and/or allowedCG-List may be present in the LCH configuration for SDT. The fields of the allowedSCS-List, the maxPUSCH-Duration, the allowedServingCell, and/or the allowedPHY-PriorityIndex may be absent in the LCH configuration for SDT.

In some implementations, the UE may only apply/store one or more (or any combination) of the parameters/IEs of the second set of parameters (e.g., when the UE performs one or more Actions (a)-(d), as described above). For example, the UE may only apply/store the configuredGrantType1Allowed and/or allowedCG-List in the LCH configuration for SDT (e.g., when the UE performs one or more Actions (a)-(d), as described above). In some implementations, UE may only replace one or more (or any combination) of the parameters/IEs of the second set of parameters with the parameter/IE(s) in the stored LCH configuration (e.g., when the UE performs one or more Actions (a)-(d), as described above).

In some implementations, the (default) MAC Cell Group configuration for SDT may include an LCH configuration for SDT. The values of the parameters of the (default) MAC Cell Group configuration for SDT may be as specified in the 3GPP TS (e.g., TS 38.331). The values of the parameters of the (default) MAC Cell Group configuration for SDT may be pre-configured. The (default) MAC Cell Group configuration for SDT may further include (but not limited to) a BSR configuration (e.g., for SDT), a PHR configuration (e.g., for SDT), a TA configuration (e.g., for SDT). The (default) MAC Cell Group configuration for SDT may further include (but not limited to) drx-Config, schedulingRequestConfig, bsr-Config, tag-Config, phr-Config, skipUplinkTxDynamic, csi-Mask, dataInactivityTimer, and/or lch-BasedPrioritization.

In some implementations, the (default) CCCH configuration for SDT may include an LCH configuration for SDT. The values of the parameters of the CCCH configuration for SDT may be as specified in the 3GPP TS (e.g., 3GPP TS 38.331). The values of the parameters of the CCCH configuration for SDT may be pre-configured.

The LCH configuration for SDT may (only) be configured for LCH/RB/RLC which is associated with all or a subset of DRB(s)/SRB(s) configured for the SDT. The LCH configuration for SDT may be (mandatorily) present for a logical channel with UL if the logical channel is associated with a DRB/SRB configured for the SDT. The LCH configuration for SDT may be referred to as an SDT-logicalchannelconfig.

In some implementations, when the UE is in the RRC_I-NACTIVE state and/or is initiating an SDT procedure, the UE may apply the LCH configuration for SDT and may ignore the (stored) LCH configuration the is not configured for SDT, e.g., if the LCH configuration, that is not configured for SDT, is stored at the UE (e.g., configured in the RRC_CONNECTED state). In some implementations, when the UE is in the RRC_INACTIVE state and/or is initiating the SDT procedure, the UE may replace the LCH configuration for SDT with the (stored) LCH configuration that is not configured for SDT (e.g., which is configured in the RRC_CONNECTED state).

In some implementations, when the UE replaces the parameter/IE(s) in the stored LCH configuration with the received/configured parameter/IE(s) in the LCH configuration for SDT, the UE may clear the parameter/IE(s) in the stored LCH configuration. The UE may release/discard the stored LCH configuration from the UE Inactive AS context. The UE may release/discard the first set of parameters and/or the second set of parameters that are stored in the LCH configuration from the UE Inactive AS context.

In some implementations, upon/after initiation of an SDT procedure and/or an RRC connection resume procedure for SDT, the UE may clear the parameter/IE(s) in the stored LCH configuration. The UE may release/discard the stored LCH configuration from the UE Inactive AS context. The UE may release/discard the first set of parameters and/or the second set of parameters that are stored in the LCH configuration from the UE Inactive AS context.

In some implementations, upon/after initiation of a non-SDT procedure (e.g., RRC connection resume procedure), the UE may clear the parameter/IE(s) in the stored LCH configuration. The UE may release/discard the stored LCH configuration from the UE Inactive AS context. The UE may release/discard the first set of parameters and/or the second set of parameters that are stored in the LCH configuration from the UE Inactive AS context.

In some implementations, upon/after initiation of an SDT procedure and/or an RRC connection resume procedure for SDT, the UE may apply a specific SRB1 configuration (e.g., configured for SDT), and/or the UE may not apply the default SRB1 configuration (e.g., as specified in the 3GPP TS 38.331).

Conditions of LCH Configuration for RA-SDT/CG-SDT

In some implementations, the UE may be configured with different LCH configurations for RA-SDT and CG-SDT.

In some implementations, the UE may be configured with a first LCH configuration for RA-SDT (e.g., the first LCH configuration may be configured in the RA configuration for SDT). The UE may also be configured with a second LCH configuration for CG-SDT (e.g., the second LCH configuration may be configured in the CG configuration for SDT). The UE may apply the first LCH configuration for RA-SDT when the UE initiates an RA-SDT procedure. The UE may apply the second LCH configuration for CG-SDT when the UE initiates a CG-SDT procedure. When the UE initiates an RA-SDT procedure, the UE may apply the first LCH configuration for RA-SDT and may release (or ignore) the second LCH configuration for CG-SDT if configured/stored (e.g., at the UE). When the UE initiates a CG-SDT procedure, the UE may apply the second LCH configuration for CG-SDT and may release (or ignore) the first LCH configuration for RA-SDT if configured/stored (e.g., at the UE). When an SDT procedure is completed/terminated/failed, the UE may release the first LCH configuration for RA-SDT and/or the second LCH configuration for CG-SDT. When an RA-SDT procedure is completed/terminated/failed, the UE may release the first LCH configuration for RA-SDT. When a CG-SDT procedure is completed/terminated/failed, the UE may release the second LCH configuration for CG-SDT. When the UE implements a fallback mechanism (e.g., the UE fallbacks from a first SDT procedure (such as a CG-SDT procedure) to a second SDT procedure (such as an RA-SDT procedure)), the UE may or may not replace the applied LCH configuration for the first SDT procedure by the LCH configuration for the second procedure (e.g., after the UE decides to fallback).

In some implementations, the UE may only be configured with an LCH configuration for CG-SDT (e.g., the second LCH configuration may be configured in the CG configuration for SDT). That is, the UE may not be configured with an LCH configuration for RA-SDT. In some such implementations, the UE may apply the LCH configuration when the UE initiates a CG-SDT procedure, and the UE may not apply the LCH configuration when the UE initiates an RA-SDT procedure. The LCH configuration may be configured/present if the UE is configured with the CG configuration/resource for SDT. The LCH configuration may be absent if the UE is not configured with the CG configuration/resource for SDT.

The configuredGrantType1Allowed may be configured in the LCH configuration (e.g., for SDT). If the field of configuredGrantType1Allowed is present and/or if the capability lcp-Restriction (e.g., for SDT and/or for RRC_INACTIVE) is supported, the UL MAC SDUs from this logical channel may be transmitted on a configured grant type 1 (e.g., for SDT).

The configuredGrantType1Allowed may be configured in the LCH configuration (e.g., for SDT). If the field of configuredGrantType1Allowed is present and/or if the capability lcp-Restriction (e.g., for SDT and/or for RRC_INACTIVE) is not supported, the UL MAC SDUs from this logical channel may be transmitted on a configured grant type 1 (e.g., for SDT).

The configuredGrantType1Allowed may be configured in the LCH configuration (e.g., for SDT). If the field of configuredGrantType1Allowed is not present and/or if the capability lcp-Restriction (e.g., for SDT and/or for RRC_INACTIVE) is supported, the UL MAC SDUs from this logical channel cannot be transmitted on a configured grant type 1 (e.g., for SDT).

In some implementations, the configuredGrantType1-Allowed (e.g., in the LCH configuration) may be configured for the SDT. The configuredGrantType1Allowed may be referred to as the sdt-configuredGrantType1Allowed. The configuredGrantType1Allowed (e.g., in the LCH configuration) may (only) be configured by the NW for the CG-SDT. The configuredGrantType1Allowed (e.g., in the LCH configuration) may (only) be applied by the UE for the CG-SDT. The configuredGrantType1Allowed (e.g., in the LCH configuration) may not be configured by the NW for the RA-SDT. The configuredGrantType1Allowed (e.g., in the LCH configuration) may not be applied by the UE for the RA-SDT.

In some implementations, the field of configuredGrantType1Allowed (e.g., in the LCH configuration) may be (mandatorily) present for the SDT (e.g., in the SDT configuration), e.g., for all LCHs/RBs configured for SDT. The field of configuredGrantType1Allowed (e.g., in the LCH configuration) may be (mandatorily) present if the DRB/SRB associated with this LCH is configured for SDT. If the suspendConfig includes the sdt-Config, the UE may consider the DRB to be configured for SDT for each of the DRB included in the sdt-DRBList. If sdt-SRB2 Indication is included (e.g., in the sdt-Config), the UE may consider that SRB2 is configured for SDT. If at least one DRB or the SRB2 is configured for SDT, the UE may consider that SRB1 is configured for SDT.

The field of configuredGrantType1Allowed (e.g., in the LCH configuration) may be (mandatorily) present for the CG-SDT or when the CG configuration for SDT is configured, e.g., for all the LCHs/RBs configured for SDT. The field of configuredGrantType1Allowed (e.g., in the LCH configuration) may be absent when the CG configuration for SDT is not configured, e.g., for all the LCHs/RBs configured for SDT. The field of configuredGrantType1Allowed (e.g., in the LCH configuration) may be absent for the RA-SDT (e.g., in the RA configuration for SDT), e.g., for all the LCHs/RBs configured for SDT. The field of configuredGrantType1Allowed may be (mandatorily) presented in the second LCH configuration for the CG-SDT. The field of configuredGrantType1Allowed may not be presented in the first LCH configuration for the RA-SDT.

The allowedCG-List may be configured in the LCH configuration (e.g., for SDT). The restriction of allowedCG-List may apply (only) when the UL grant is a configured grant (e.g., for SDT). If the field of allowedCG-List is present and/or if the capability lch-ToConfiguredGrantMapping (e.g., for SDT and/or for RRC_INACTIVE) is supported, UL MAC SDUs from the corresponding logical channel may only be mapped to the indicated configured grant configuration (e.g., for SDT). If the size of the allowedCG-List is zero and/or if the capability lch-ToConfiguredGrantMapping (e.g., for SDT and/or for RRC_INACTIVE) is supported, then UL MAC SDUs from the corresponding logical channel may not be mapped to any configured grant configurations (e.g., for SDT). If the field of allowedCG-List is not present and/or if the capability lch-ToConfiguredGrantMapping (e.g., for SDT and/or for RRC_INACTIVE) is not supported, UL MAC SDUs from the corresponding logical channel may be mapped to any configured grant configurations (e.g., for SDT). If the field configuredGrantType1Allowed is present, only those configured grant type 1 configurations indicated in the allowedCG-List are allowed for use by the corresponding logical channel; otherwise, the allowedCG-List may not include any configured grant type 1 configuration (e.g., for SDT).

In some implementations, the allowedCG-List (e.g., in the LCH configuration) may be configured for SDT. The allowedCG-List may be referred to sdt-allowedCG-List. The allowedCG-List (e.g., in the LCH configuration) may (only) be configured by the NW for CG-SDT. The allowedCG-List (e.g., in the LCH configuration) may (only) be applied by the UE for CG-SDT. The allowedCG-List (e.g., in the LCH configuration) may not be configured by the NW for the RA-SDT. The configuredGrantType1Allowed (e.g., in the LCH configuration) may not be applied by the UE for the RA-SDT.

In some implementations, the field of allowedCG-List (e.g., in the LCH configuration) may be (mandatorily) present for the SDT (e.g., in the SDT configuration), e.g., for all the LCHs/RBs configured for SDT. The field of allowedCG-List (e.g., in the LCH configuration) may be (mandatorily) present if the DRB/SRB associated with this LCH is configured for SDT. If the suspendConfig includes sdt-Config, the UE may consider the DRB to be configured for SDT for each of the DRBs included in the sdt-DRBList. If sdt-SRB2Indication is included (e.g., in the sdt-Config), the UE may consider that SRB2 is configured for SDT. If at least one DRB or the SRB2 is configured for SDT, the UE may consider that SRB1 is configured for SDT.

The field of allowedCG-List (e.g., in the LCH configuration) may be (mandatorily) present for the CG-SDT or when the CG configuration for SDT is configured (e.g., for all LCHs/RBs configured for SDT). The field of allowedCG-List (e.g., in the LCH configuration) may be absent when the CG configuration for SDT is not configured (e.g., for all LCHs/RBs configured for SDT). The field of allowedCG-List (e.g., in the LCH configuration) may be absent for RA-SDT (e.g., in the RA configuration for SDT), e.g., for all LCHs/RBs configured for SDT. The field of allowedCG-List may be (mandatorily) presented in the second LCH configuration for CG-SDT. The field of allowedCG-List may not be presented in the first LCH configuration for RA-SDT.

LCH Configuration

The IE LogicalChannelConfig may be used to configure the logical channel parameters. Table 4 below shows an example of the IE LogicalChannelConfig.

TABLE 4

LogicalChannelConfig information element

```
LogicalChannelConfig ::=        SEQUENCE {
    ul-SpecificParameters           SEQUENCE {
        priority                        INTEGER (1..16),
        prioritisedBitRate              ENUMERATED {kBps0, kBps8, kBps16, kBps32,
kBps64, kBps128, kBps256, kBps512,
                                        kBps1024, kBps2048, kBps4096, kBps8192,
kBps16384, kBps32768, kBps65536, infinity},
        bucketSizeDuration              ENUMERATED {ms5, ms10, ms20, ms50,
ms100, ms150, ms300, ms500, ms1000,
                                        spare7, spare6, spare5,
spare4, spare3,spare2, spare1},
        allowedServingCells             SEQUENCE (SIZE (1..maxNrofServingCells-1))
OF ServCellIndex
OPTIONAL,   -- Cond PDCP-CADuplication
        allowedSCS-List                 SEQUENCE (SIZE (1..maxSCSs)) OF
SubcarrierSpacing                   OPTIONAL,   -- Need R
        maxPUSCH-Duration               ENUMERATED {ms0p02, ms0p04,
ms0p0625, ms0p125, ms0p25, ms0p5, spare2, spare1}
OPTIONAL,   -- Need R
        configuredGrantType1Allowed     ENUMERATED {true}
OPTIONAL,   -- Need R
        logicalChannelGroup             INTEGER (0..maxLCG-ID)
OPTIONAL,   -- Need R
        schedulingRequestID             SchedulingRequestId
OPTIONAL,   -- Need R
        logicalChannelSR-Mask               BOOLEAN,
        logicalChannelSR-DelayTimerApplied  BOOLEAN,
        ...,
        bitRateQueryProhibitTimer       ENUMERATED {s0, s0dot4, s0dot8, s1dot6, s3, s6, s12,
s30}             OPTIONAL,   -- Need R
        [[
        allowedCG-List-r16              SEQUENCE (SIZE (0..
maxNrofConfiguredGrantConfigMAC-r16-1)) OF ConfiguredGrantConfigIndexMAC-r16
OPTIONAL,   -- Need S
        allowedPHY-PriorityIndex-r16    ENUMERATED {p0, p1}
OPTIONAL    -- Need S
        ]]
    }
OPTIONAL,   -- Cond UL
    ...,
    [[
    channelAccessPriority-r16       INTEGER (1..4)
OPTIONAL,   -- Need R
    bitRateMultiplier-r16           ENUMERATED {x40, x70, x100, x200}
OPTIONAL    -- Need R
    ]]
}
```

Table 5 below shows an example of the LogicalChannel-Config field descriptions.

TABLE 5

LogicalChannelConfig field descriptions allowedCG-List
This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. If the field configuredGrantType1Allowed is present, only those configured grant type 1 configuration indicated in this sequence are allowed for use by this logical channel; otherwise, this sequence shall not include any configured grant type 1 configuration. Corresponds to "allowedCG-List" as specified in the 3GPP TS 38.321.
allowedPHY-PriorityIndex
This restriction applies only when the UL grant is a dynamic grant. If the field is present and the dynamic grant has a PHY-priority index, UL MAC SDUs from this logical channel can only be mapped to the dynamic grants indicating PHY-priority index equal to the values configured by this field. If the field is present and the dynamic grant does not have a PHY-priority index, UL MAC SDUs from this logical channel TABLE 5-continued LogicalChannelConfig field descriptions can only be mapped to this dynamic grant if the value of the field is p0, see TS 38.213 [13], clause 9. If the
field is not present, UL MAC SDUs from this logical channel can be mapped to any dynamic grants.
Corresponds to "allowedPHY-PriorityIndex" as specified in the 3GPP TS 38.321.
allowedSCS-List
If present, UL MAC SDUs from this logical channel can only be mapped to the indicated numerology.
Otherwise, UL MAC SDUs from this logical channel can be mapped to any configured numerology. Only the
values 15/30/60 kHz (for FR1) and 60/120 kHz (for FR2) are applicable. Corresponds to 'allowedSCS-List' as
specified in the 3GPP TS 38.321.
allowedServingCells
If present, UL MAC SDUs from this logical channel can only be mapped to the serving cells indicated in this
list. Otherwise, UL MAC SDUs from this logical channel can be mapped to any configured serving cell of
this cell group. Corresponds to 'allowedServingCells' in the 3GPP TS 38.321.
bitRateMultiplier
Bit rate multiplier for recommended bit rate MAC CE as specified in the 3GPP TS 38.321. Value x40
indicates bit rate multiplier 40, value x70 indicates bit rate multiplier 70 and so on.
bitRateQueryProhibitTimer
The timer is used for bit rate recommendation query in the 3GPP TS 38.321, in seconds. Value s0 means 0 s,
s0dot4 means 0.4 s and so on.
bucketSizeDuration
Value in ms. ms5 corresponds to 5 ms, value ms10 corresponds to 10 ms, and so on.
channelAccessPriority
Indicates the Channel Access Priority Class (CAPC), as specified in the 3GPP TS 38.300, to be used on
uplink transmissions for operation with shared spectrum channel access. The network configures this field
only for SRB2 and DRBs.
configuredGrantType1Allowed
If present, or if the capability lcp-Restriction as specified in the 3GPP TS 38.306 is not supported, UL MAC
SDUs from this logical channel can be transmitted on a configured grant type 1. Otherwise, UL MAC SDUs
from this logical channel cannot be transmitted on a configured grant type 1. Corresponds to
'configuredGrantType1Allowed' in the 3GPP TS 38.321.
logicalChannelGroup
ID of the logical channel group, as specified in the 3GPP TS 38.321, which the logical channel belongs to.
logicalChannelSR-Mask
Controls SR triggering when a configured uplink grant of type1 or type2 is configured, true indicates that SR
masking is configured for this logical channel as specified in the 3GPP TS 38.321.
logicalChannelSR-DelayTimerApplied
Indicates whether to apply the delay timer for SR transmission for this logical channel. Set to false if
logicalChannelSR-DelayTimer is not included in BSR-Config.
maxPUSCH-Duration
If present, UL MAC SDUs from this logical channel can only be transmitted using uplink grants that result in
a PUSCH duration shorter than or equal to the duration indicated by this field. Otherwise, UL MAC SDUs
from this logical channel can be transmitted using an uplink grant resulting in any PUSCH duration.
Corresponds to "maxPUSCH-Duration" in the 3GPP TS 38.321. The PUSCH duration is calculated based on
the same length of all symbols, and the shortest length applies if the symbol lengths are different.
priority
Logical channel priority, as specified in the 3GPP TS 38.321.
prioritisedBitRate
Value in kiloBytes/s. Value kBps0 corresponds to 0 kiloBytes/s, value kBps8 corresponds to 8 kiloBytes/s,
value kBps16 corresponds to 16 kiloBytes/s, and so on. For SRBs, the value can only be set to infinity.
schedulingRequestId
If present, it indicates the scheduling request configuration applicable for this logical channel, as specified in
the 3GPP TS 38.321.

SDT Assumptions

The SDT may be supported as a baseline for RA-based SDT and CG-based SDT schemes. The stored configuration in the UE Context may be used for the RLC bearer configuration. The 2-step RACH or the 4-step RACH may be applied to an RA-based SDT in the RRC_INACTIVE state. The UL small data may be sent in an MsgA of a 2-step RACH and/or an Msg3 of a 4-step RACH. The SDT may be configured by the network on a per RB (e.g., SRB/DRB) basis. The data volume threshold may be used for the UE to decide whether to perform/select an SDT procedure (e.g., initiate an SDT procedure, initiate an RA procedure for SDT, and/or initiate an SDT procedure with CG) or perform/select a non-SDT procedure (e.g., initiate an RA procedure for a CCCH logical channel). When the UE is in an RRC_INACTIVE state, the UE may send one or more UL and DL packets as part of the same SDT procedure and without transitioning to the RRC_CONNECTED state (e.g., the UE may remain in the RRC_INACTIVE state).

When the UE receives an RRC release message (e.g., with suspend configuration), the UE may perform the following actions (a)-(c).

(a) MAC entity may be reset, and default Radio bearer configuration may be released.

(b) RLC entities for SRB1 may be re-established.

(c) SRBs and DRBs may be suspended, except SRB0.

Upon initiating the SDT procedure (e.g., for the first transmission of small data), the UE may re-establish at least the PDCP entities (e.g., for SDT) and/or resume the RBs (e.g., for SDT). The first UL message of SDT (e.g., an Msg3 for a 4-step RACH, an MsgA payload for a 2-step RACH and/or the CG transmission) may include at least the following (a)-(d) (which may be depending on the size of the message).

(a) A CCCH message.

(b) Data from one or more RBs which are configured by the network for small data transmission.

(c) MAC CEs (e.g., BSR and PHR).

(d) Padding bits.

The LCP may be used to determine the priority of the following (a)-(c).

(a) Data from one or more RBs which are configured by the network for small data transmission.

(b) MAC CEs (e.g., BSR and PHR).

(c) Padding bits.

The CCCH message may include ResumeMAC-I generated using the stored security key for RRC integrity protection. New keys may be generated using the stored security context and the NCC value received in the previous RRC Release message, and the new keys may be used for generating the data of RBs that are configured for SDT.

For a CG-based SDT, the configuration of a CG resource for uplink small data transmission may be included in the RRC Release message. For a CG-based SDT, a TA timer (e.g., cg-SDT-TimeAlignmentTimer) for the TA maintenance specified for a CG based small data transmission in the RRC_INACTIVE state may be applied. The TA timer may be configured together with the CG configuration in the RRC Release message. For a CG-based SDT, the configuration of a CG resource for small data transmission may be valid only in the same serving cell (e.g., the configuration of the CG resource for small data transmission may be invalid if the UE camps on another cell). For the CG-based SDT, the UE may use a CG-based small data transmission if at least one of the following criteria (a)-(c) is fulfilled. (a) the user data is smaller than a data volume threshold; (b) the CG resource is configured and valid; (c) the UE has a valid TA.

For a CG-based SDT, an association between the CG resources and the SSBs may be required for a CG-based SDT. For a CG-based SDT, an SS-RSRP threshold may be configured for the SSB selection. The UE may select one of the SSBs with an SS-RSRP above the threshold and may select the associated CG resource for the UL data transmission. For a CG-based SDT, the CG-SDT resource configuration may be provided to the UEs that are in the RRC_CONNECTD state, for example, via the RRC Release message. For a CG-based SDT, the CG resources (e.g., PUSCH resources) may be separately configured for the NUL and the SUL. For a CG-based SDT, the RRC Release message may be used to reconfigure or release the CG-SDT configuration/resources while the UE is in the RRC_INACTIVE state.

For a CG-based SDT, the subsequent data transmission may use the CG resource or DG (e.g., dynamic grant addressed to UE's C-RNTI/CS-RNTI). The C-RNTI/CS-RNTI may be the same as the previous C-RNTI/CS-RNTI or may be configured explicitly by the network. For a CG-based SDT, a TA timer (e.g., cg-SDT-TimeAlignmentTimer) may be started upon receiving the TA configuration from a gNB, e.g., via an RRC release message, and may be (re) started upon reception of a TA command. For a CG-based SDT, the UE may release the CG configuration/resources when the TAT expires (e.g., while the UE is in the RRC_INACTIVE state). For an RA-based SDT, up to two preamble groups (e.g., corresponding to two different payload sizes for the MsgA/Msg3) may be configured by the network. For an RA-based SDT, upon a successful completion of the contention resolution, the UE may monitor the C-RNTI.

For an RA-based SDT, a RACH resource, e.g., (RO+ preamble combination), may be different between an SDT (e.g., RA for SDT) and a non-SDT (e.g., RA for CCCH or RA for RRC connection resume). For an RA-based SDT, the RRC Release message may be sent at the end to terminate the SDT procedure (e.g., from RRC point of view). The RRC Release message sent at the end of the SDT may include the CG resource. An RSRP threshold (e.g., sdt-RSRP-Threshold) may be used to select between an SDT (e.g., initiate SDT procedure, initiate RA procedure for SDT, and/or initiate SDT procedure with CG) and a non-SDT procedure (e.g., initiate RA procedure for CCCH logical channel). For an SDT, the UE may perform UL carrier selection (e.g., UL and SUL selection).

If the CG-SDT resources are configured on the selected UL carrier and are valid, the CG-based SDT may be selected to perform. If the 2-step RA resources (e.g., for SDT) are configured on the UL carrier and criteria to select 2-step RA (e.g., for SDT) is met, the 2-step RA type (e.g., for SDT) may be selected. If 4-step RA resources (e.g., for SDT) are configured on the UL carrier and criteria to select 4-step RA (e.g., for SDT) is met, the 4-step RA type may be selected. The UE may not perform the SDT procedure (e.g., the UE may perform the RRC connection resume procedure). If both 2-step RA (e.g., for SDT) and 4-step RA resources (e.g., for SDT) are configured on the UL carrier, RA type selection (e.g., 2-step and 4-step RA type selection) may performed based on an RSRP threshold (e.g., sdt-MSGA-RSRP-Threshold).

In addition to DRB, SRB1 and SRB2 may be configured for SDT (e.g., for carrying RRC and/or NAS messages). Upon initiating the SDT procedure and/or RRC resume procedure for SDT initiation (e.g., for the first SDT transmission), the UE may resume the SRB (e.g., SRB1, SRB2, and/or SRB3) that is configured for SDT (e.g., in addition to the SDT DRBs that are configured for SDT). A specific search space may be supported for monitoring the PDCCH addressed to the C-RNTI after a successful completion of the RACH procedure during the RA-SDT.

An RSRP threshold (e.g., sdt-RSRP-Threshold) may be used to select between an SDT and a non-SDT procedure, if configured (e.g., RSRP may refer to the same RSRP that is measured for carrier selection). An RSRP threshold (e.g., sdt-RSRP-Threshold) to select between an SDT and a non-SDT procedure may be used for both CG-SDT and RA-SDT. An RSRP threshold (e.g., sdt-RSRP-Threshold) to select between an SDT and a non-SDT procedure may be the same for both the CG-SDT and the RA-SDT. An RSRP threshold for carrier selection (e.g., sdt-RSRP-ThresholdSSB-SUL) may be specific to the SDT (e.g., separately configured for SDT). This may be optional for the network. An RSRP threshold for the RA type selection (e.g., sdt-MSGA-RSRP-Threshold) may be specific to the SDT (e.g., separately configured for SDT).

A Data volume threshold (e.g., sdt-DataVolumeThreshold) may be the same for the CG-SDT and the RA-SDT. Switching/fallback from the SDT procedure to the non-SDT procedure (e.g., an RRC connection resume procedure) may be applied based on some criteria. A switching/fallback from the CG-SDT to the RA-SDT may be applied based on some criteria. The UE may switch from the SDT procedure to the non-SDT procedure (e.g., an RRC connection resume procedure) in the following cases (a) and (b).

(a): UE receives indication from the network to switch to the non-SDT procedure. For example, the network may send an RRC Resume message, and/or may send an indication in the RAR/fallbackRAR/DCI to switch to the non-SDT procedure.

(b): Initial UL transmission (in MsgA/Msg3/CG resources) fails for a (configured) number of times.

The UE may perform a PDCP re-establishment implicitly (e.g., without explicit indication for the PDCP re-establishment), when the UE initiates the SDT procedure. The SR resource (e.g., a PUCCH resource for SR) may not be configured for SDT. When the BSR is triggered by SDT data, the UE may trigger an RA because the SR resource is not available. An SDT failure detection timer may be started upon initiation of the SDT procedure. Upon an SDT failure detection timer expiry, the UE may transition to an RRC_IDLE state and/or mat attempt an RRC connection setup. The CG resources for SDT may be configured at the same time on the NUL and SUL. The UE may start a timer after a UL transmission (e.g., for CG-SDT). The CG resources for SDT may be configured on the BWPs, other than the initial BWP. The CG resources per CG configuration may be associated with a set of SSB(s) configured by explicit signaling.

The specific search space may be a common search space to the UEs performing the RA-SDT. A UE-specific search space may be configured for the UEs that perform the CG-SDT. The UE may monitor the paging after the UE initiates an SDT for the system information change and/or for a Public Warning System (PWS). For a CG-based SDT, the SSB-to-PUSCH resource mapping within the CG configuration may be implicitly defined. The ordering of the SSB and CG PUSCH resources may be captured in RAN1 specification (e.g., as specified in 3GPP TS 38.213). A PUSCH resource may refer to a transmission occasion and a DMRS resource used for the PUSCH transmission.

The SSB subset for RSRP based TA validation may be determined at least based on a configured absolute RSRP threshold. The SSB subset may be (a) within a set of SSBs configured per CG configuration, (b) within a set of SSBs configured for all CG configurations, (c) within a set of all SSBs actually transmitted as indicated in SIB1, or (d) highest N SSBs that are measured to derive the subset for a UE across all CG configurations.

Data volume used for SDT selection criteria may be calculated as the total sum of Buffer Size across SDT RBs. For example, the UE may determine the amount of UL data available for a logical channel according to the data volume calculation procedure as specified in the 3GPP TS 38.322 and 3GPP TS 38.323.

Table 6 below shows an example of data volume calculation as specified in the 3GPP TS 38.322.

TABLE 6

For the purpose of MAC buffer status reporting, the UE shall consider the following as RLC data volume:
- RLC SDUs and RLC SDU segments that have not yet been included in an RLC data PDU;
- RLC data PDUs that are pending for initial transmission;
- RLC data PDUs that are pending for retransmission (RLC AM).

Table 7 below shows an example of data volume calculation as specified in the 3GPP TS 38.323.

TABLE 7

For the purpose of MAC buffer status reporting, the transmitting PDCP entity shall consider the following as PDCP data volume:
- the PDCP SDUs for which no PDCP Data PDUs have been constructed;
- the PDCP Data PDUs that have not been submitted to lower layers;
- the PDCP Control PDUs;
- for AMDRBs, the PDCP SDUs to be retransmitted;
- for AMDRBs, the PDCP Data PDUs to be retransmitted.

At initiation of an SDT procedure, the PDCP status report may not be triggered even if the RB is configured with statusReportRequired. The RRC layer may indicate to the PDCP layer to disable the PDCP status report, e.g., by de-configuring statusReportRequired (e.g., UE internally indicates). For an SDT procedure selection, same data volume threshold may be used for the CG-SDT and the RA-SDT. The BSR configuration used for the SDT may be different from the BSR configuration used in the RRC_CONNECTED state. The UE may perform an RLC re-establishment implicitly (e.g., without explicit indication for RLC re-establishment), when the UE initiates the SDT procedure.

During the SDT procedure, all the triggered PHRs may be cancelled if all the SDT data are included in the UL grant, and/or if there is no room in the MAC PDU to fit the PHR. The LCH restrictions may be applied, reusing existing signaling. The PDCP entities of only the non-SDT RBs may be re-established (e.g., not for the SDT RBs) when the UE transitions from the RRC_INACTIVE state, with an ongoing SDT session, to the RRC_CONNECTED state. Events that trigger a termination or failure of an ongoing SDT session/procedure may be the following (a)-(c).

(a) A cell reselection.
(b) The expiry of the SDT failure detection timer.
(c) When the Max retx is reached in the RLC. The RLC AM max retransmission functionality may remain unchanged.

When a UE detects a failure of an ongoing SDT session/procedure, the UE may transition autonomously into the RRC_IDLE state. The SDT related RACH resources may be configured via the system information (e.g., SIB1). At least the following parameters (a)-(c) may be RA-SDT specific.

(a) SSB selection related parameters (e.g., rsrp-ThresholdSSB, msgA-RSRP-ThresholdSSB).
(b) Power control related parameters (e.g., preambleReceivedTargetPower/gA-PreambleReceivedTargetPower, powerRampingStep/msgA-PreamblePowerRampingStep, msg3-DeltaPreamble/msgA-DeltaPreamble).
(c) Preamble group related parameters (e.g., msg3-DeltaPreamble/msgA-DeltaPreamble, messagePowerOffsetGroupB for 2-step RA-SDT and 4-step RA-SDT).

For a shared ROs case, all the following configurations (a)-(c) may be allowed.

(a) 4-step RA-SDT shares ROs with 4-step RA and/or 2-step RA.
(b) 2-step RA-SDT shares Ros with 4-step RA and/or 2-step RA.
(c) 2-step RA-SDT shares ROs with 4-step RA-SDT and/or 4-step RA and/or 2-step RA.

For the RA-SDT preamble group selection, the UE may consider the SDT data size plus MAC subheader in addition to the CCCH SDU size plus MAC subheader and pathloss. The fallbackRAR reception as the legacy 2-step RACH may be supported in a 2-step RA-SDT (e.g., fallback from a 2-step RA-SDT to a 4-step RA-SDT when fallbackRAR is received). The UE may be configured to switch from the 2-step RA-SDT to the 4-step RA-SDT after N times of MsgA transmission. The PUCCH resources may be used for HARQ-ACK during the subsequent SDT transmissions (e.g., applicable for both RA and CG). The UE may suspend all the UL transmissions and may trigger a RACH if any UL transmission is needed when the TAT expires during an RA-SDT procedure. The RA-SDT may be configured on an initial BWP or a non-initial BWP. The UE may select any SSB if there is no qualified SSB for the RA-SDT, for example, similar to the legacy. If none of the SSBs' RSRPs is above the RSRP threshold of CG-SDT criteria in the type selection phase, the UE may select the RA-SDT if the RA-SDT criteria is met.

During a subsequent CG transmission phase (e.g., after the UE has received response from the NW), the UE may initiate at least a legacy RACH procedure (e.g., trigger due to no UL resources) based on one or more of the following conditions (a)-(c).

(a) no qualified SSB when the evaluation is performed.
(b) when TA is invalid.
(c) when SR is triggered due to lack of UL resource.

The UE may release a CG-SDT resource (e.g., if stored at the UE) when the UE initiates an RRC resume procedure from another cell which is different from the cell in which the RRC Release message is received. The C-RNTI previously configured in the RRC_CONNECTED state may be used for the UE to monitor the PDCCH in the CG-SDT. The CS-RNTI based dynamic retransmission mechanism may be reused for the CG-SDT. The CS-RNTI may be the same one as the one previously configured in the RRC_CONNECTED state or a new CS-RNTI provided to the UE.

During a subsequent new CG transmission phase, for the purpose of the CG resource selection, the UE may re-evaluate the SSB for the subsequent CG transmission. At least the following parameters (a)-(c) may be included in the CG-SDT configuration.

(a) The new TA timer in RRC_INACTIVE.
(b) The RSRP change threshold for TA validation mechanism in SDT (details dependent on RAN1).
(c) The SSB RSRP threshold for beam selection (e.g., UE selects the beam and associated CG resource for data transmission).

Each N of consecutive SSB indexes associated with one CG configuration may be mapped to valid CG PUSCH resources. For example, in increasing order of DMRS resource indexes, where a DMRS resource index DMRSid is determined first in an ascending order of a DMRS port index and second in an ascending order of a DMRS sequence index. For example, in increasing order of the CG period indexes in the association period.

The mapping ratio N may be explicitly signaled and the association period may be implicitly derived. The SSB to CG PUSCH association period may be the duration of multiple CG periods depending on the smallest time duration in a set determined by the CG period, such that all SSBs associated with the CG configuration may be mapped at least once to the CG PUSCH resources. An association pattern period may include one or more association periods and may be determined so that a pattern between the CG PUSCH occasions and the SS/PBCH block indexes associated with the CG configuration may repeat at most every 640 msec.

The following PUSCH occasion validation rules may be applied for the CG-SDT. For an unpaired spectrum and for the SS/PBCH blocks with indexes provided by ssb-PositionsInBurst in SIB1 or by ServingCellConfigCommon, (a) if a UE is provided with the tdd-UL-DL-ConfigurationCommon, the valid PO may be the PO in the UL part in a slot, or at least Ngap symbols after the end of the DL part in a slot, or after the end of the SSB in a slot, (b) if a UE is not provided with the tdd-UL-DL-ConfigurationCommon, the valid PO may not precede an SS/PBCH block in the PUSCH slot, start at least Ngap symbols after the last SS/PBCH block symbol, (c) Ngap may be provided, for example, as specified in the 3GPP TS 38.213.

Figure 5:
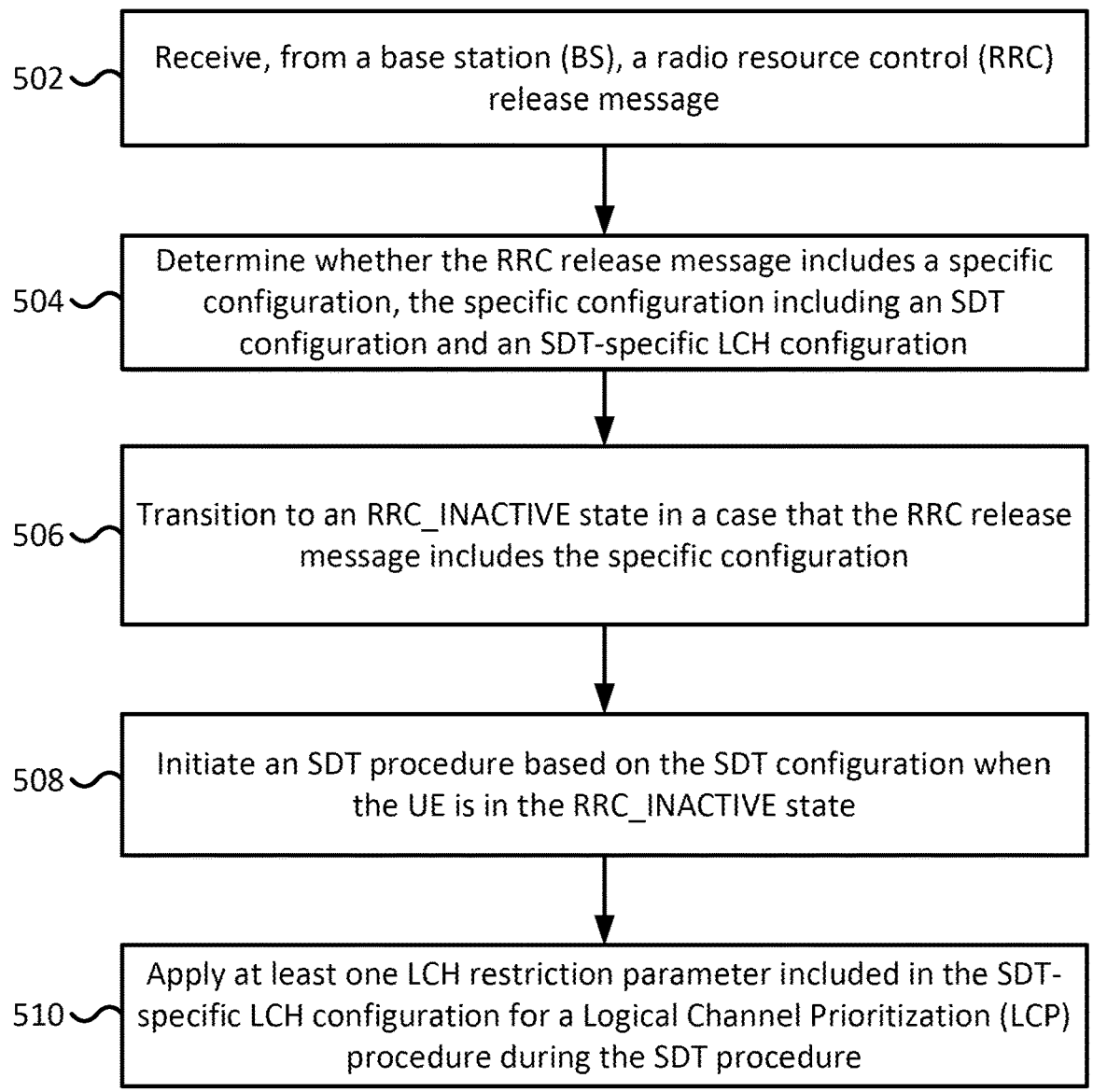
FIG. 5 is a flowchart illustrating a method performed by a UE for LCH configuration in SDT, according to an example implementation of the present disclosure.

FIG. 5 is a flowchart illustrating a method 500 performed by a UE for LCH configuration in SDT, according to an example implementation of the present disclosure. Although actions 502, 504, 506, 508, 510, and 512 are illustrated as separate actions represented as independent blocks in FIG. 5, these separately illustrated actions should not be construed as necessarily order-dependent. The order in which the actions are performed in FIG. 5 is not intended to be construed as a limitation, and any number of the disclosed blocks may be combined in any order to implement the method, or an alternate method. Moreover, each of the actions 502, 504, 506, 508, 510, and 512 may be performed independently of other actions and can be omitted in some implementations of the present disclosure.

In action S02, the UE may receive, from a base station (BS), a radio resource control (RRC) release message.

In action S04, the UE may determine whether the RRC release message includes a specific configuration. The specific configuration may include an SDT configuration and an SDT-specific LCH configuration. In some implementations, the SDT-specific LCH configuration may be included in a configured grant (CG)-SDT-specific configuration, and the CG-SDT-specific configuration may be included in the SDT configuration. In some implementations, the SDT-specific LCH configuration may be used for configured grant (CG)-SDT.

In action S06, the UE may transition to an RRC_INACTIVE state after determining that the RRC release message includes the specific configuration. In some implementations, the UE may transition to an RRC_IDLE state after determining that the RRC release message does not include the specific configuration.

In action S08, the UE may initiate an SDT procedure based on the SDT configuration when the UE is in the RRC_INACTIVE state. In some implementations, the SDT procedure may be a configured grant (CG)-SDT procedure.

In action S10, the UE may apply at least one LCH restriction parameter included in the SDT-specific LCH configuration for a Logical Channel Prioritization (LCP) procedure during the SDT procedure. In some implementations, the at least one LCH restriction parameter may include an information element (IE) configuredGrantType1Allowed. In some implementations, the at least one LCH restriction parameter may include an information element (IE) allowedCG-List.

In some implementations, the UE may apply the LCP procedure when a new transmission is performed during the SDT procedure. In some implementations, the UE may select an LCH for an uplink (UL) grant based on the at least one LCH restriction parameter when a new transmission is performed during the LCP procedure.

Figure 6:
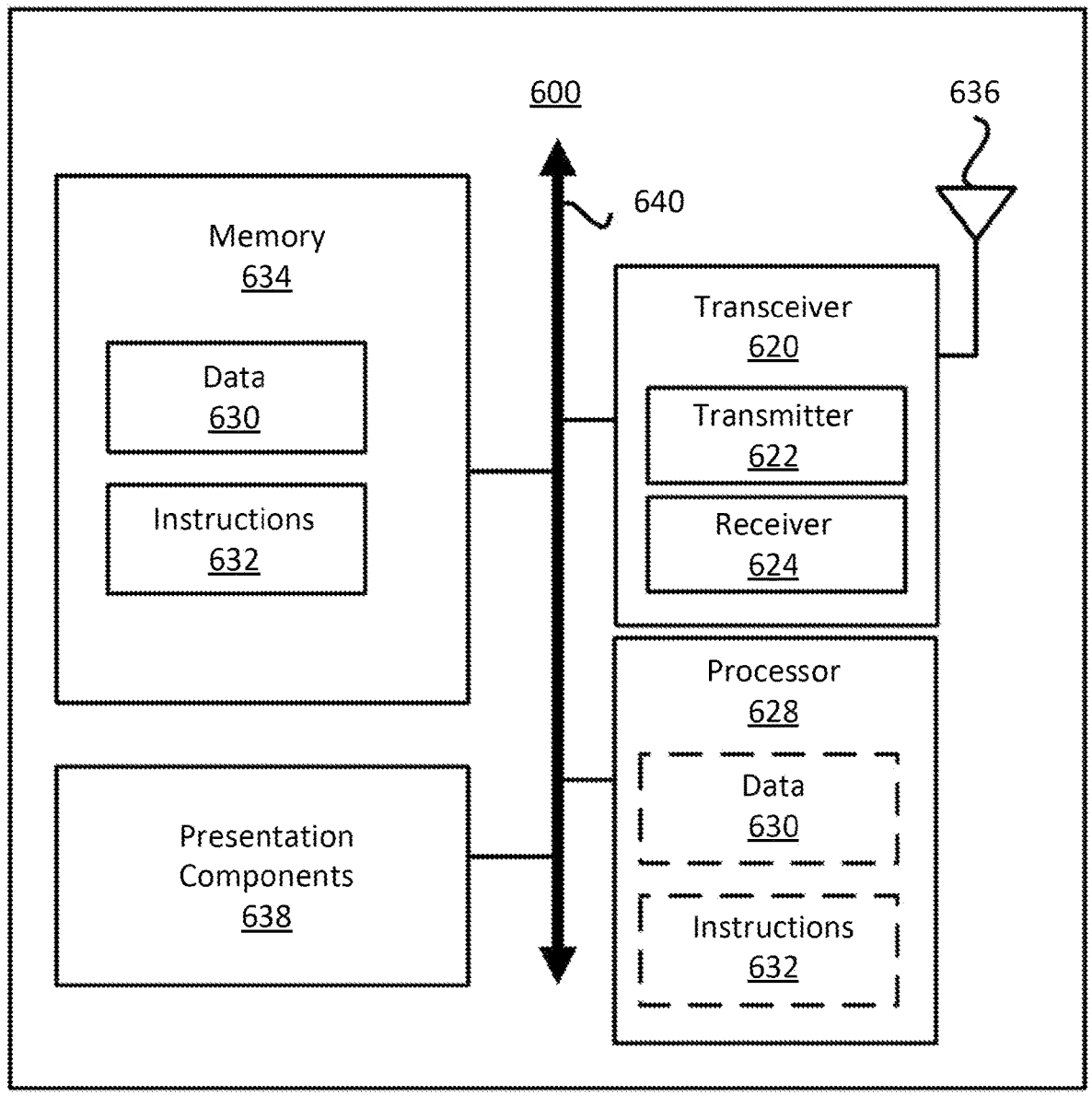
FIG. 6 is a block diagram illustrating a node for wireless communication, according to an example implementation of the present disclosure.

FIG. 6 is a block diagram illustrating a node 600 for wireless communication, according to an example implementation of the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1-5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable, and flexibly usable subframes and slot formats. The transceiver 620 may be configured to receive data and control channels.

The node 600 may include a variety of computer-readable media. Computer-readable media may be any available media that may be accessed by the node 600 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store a computer-readable and/or computer-executable program 632 (e.g., software codes) that are configured to, when executed, cause the processor 628 to perform various functions disclosed herein, for example, with reference to FIG. 5. Alternatively, the program 632 may not be directly executable by the processor 628 but may be configured to cause the node 600 (e.g., when compiled and executed) to perform various functions disclosed herein.

The processor 628 (e.g., having processing circuitry) may include an intelligent hardware device (e.g., a Central Processing Unit (CPU), a microcontroller, an ASIC, etc). The processor 628 may include memory. The processor 828 may process the data 630 and the program 632 received from the memory 634, and information transmitted and received via the transceiver 620, the base band communications module, and/or the network communications module. The processor 628 may also process information to send to the transceiver 620 for transmission via the antenna 636 to the network communications module for transmission to a CN.

One or more presentation components 638 may present data indications to a person or another device. Examples of presentation components 638 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for logical channel (LCH) configuration in small data transmission (SDT), the method comprising:
   receiving, from a base station (BS), a radio resource control (RRC) release message;
   determining whether the RRC release message includes a specific configuration, the specific configuration including an SDT configuration and an SDT-specific LCH configuration;
   transitioning to an RRC_INACTIVE state after determining that the RRC release message includes the specific configuration;
   initiating an SDT procedure based on the SDT configuration when the UE is in the RRC_INACTIVE state; and
   applying at least one LCH restriction parameter included in the SDT-specific LCH configuration for performing a Logical Channel Prioritization (LCP) procedure during the SDT procedure, wherein:
   the SDT-specific LCH configuration is included in a configured grant (CG)-SDT-specific configuration, and
   the CG-SDT-specific configuration is included in the SDT configuration.

2. The method of claim 1, wherein the at least one LCH restriction parameter includes an information element (IE) configuredGrantType1 Allowed.

3. The method of claim 1, wherein the at least one LCH restriction parameter includes an information element (IE) allowedCG-List.

4. The method of claim 1, wherein the SDT-specific LCH configuration is used for a CG-SDT.

5. The method of claim 1, wherein the SDT procedure is a CG-SDT procedure.

6. The method of claim 1, further comprising:
   performing the LCP procedure when a new transmission is performed during the SDT procedure.

7. The method of claim 1, further comprising:
   selecting an LCH for an uplink (UL) grant based on the at least one LCH restriction parameter when a new transmission is performed during the LCP procedure.

8. The method of claim 1, further comprising:
   transitioning to an RRC_IDLE state after determining that the RRC release message does not include the specific configuration.

9. A user equipment (UE) for logical channel (LCH) configuration in small data transmission (SDT), the UE comprising:
   at least one processor; and
   at least one non-transitory computer-readable medium coupled to the at least one processor and storing one or more computer-executable instructions that, when executed by the at least one processor, cause the UE to:
   receive, from a base station (BS), a radio resource control (RRC) release message;

determine whether the RRC release message includes a specific configuration, the specific configuration including an SDT configuration and an SDT-specific LCH configuration;

transition to an RRC_INACTIVE state after determining that the RRC release message includes the specific configuration;

initiate an SDT procedure based on the SDT configuration when the UE is in the RRC_INACTIVE state; and apply at least one LCH restriction parameter included in the SDT-specific LCH configuration for performing a Logical Channel Prioritization (LCP) procedure during the SDT procedure, wherein:

the SDT-specific LCH configuration is included in a configured grant (CG)-SDT-specific configuration, and the CG-SDT-specific configuration is included in the SDT configuration.

10. The UE of claim 9, wherein the at least one LCH restriction parameter includes an information element (IE) configuredGrantType1Allowed.

11. The UE of claim 9, wherein the at least one LCH restriction parameter includes an information element (IE) allowedCG-List.

12. The UE of claim 9, wherein the SDT-specific LCH configuration is used for a CG-SDT.

13. The UE of claim 9, wherein the SDT procedure is a CG-SDT procedure.

14. The UE of claim 9, wherein the one or more computer-executable instructions, when executed by the at least one processor, further cause the UE to:

perform the LCP procedure when a new transmission is performed during the SDT procedure.

15. The UE of claim 9, wherein the one or more computer-executable instructions, when executed by the at least one processor, further cause the UE to:

select an LCH for an uplink (UL) grant based on the at least one LCH restriction parameter when a new transmission is performed during the LCP procedure.

16. The UE of claim 9, wherein the one or more computer-executable instructions, when executed by the at least one processor, further cause the UE to:

transition to an RRC_IDLE state after determining that the RRC release message does not include the specific configuration.

* * * * *